US011333891B2

(12) United States Patent
Bae et al.

(10) Patent No.: US 11,333,891 B2
(45) Date of Patent: May 17, 2022

(54) WEARABLE DISPLAY APPARATUS HAVING A LIGHT GUIDE ELEMENT THAT GUIDES LIGHT FROM A DISPLAY ELEMENT AND LIGHT FROM AN OUTSIDE

(71) Applicant: SAMSUNG ELECTRONICS CO., LTD., Suwon-si (KR)

(72) Inventors: Jae-Cheol Bae, Suwon-si (KR); Myong-Jo Choi, Hwaseong-si (KR); Jun-ho Koh, Suwon-si (KR); Chang-han Kim, Suwon-si (KR); Hyun-jung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 79 days.

(21) Appl. No.: 16/747,645

(22) Filed: Jan. 21, 2020

(65) Prior Publication Data
US 2020/0150440 A1 May 14, 2020

Related U.S. Application Data

(63) Continuation of application No. 14/593,634, filed on Jan. 9, 2015, now abandoned.

(30) Foreign Application Priority Data

Jan. 9, 2014 (KR) .................. 10-2014-0002899
Dec. 10, 2014 (KR) .................. 10-2014-0177758

(51) Int. Cl.
*G02B 27/01* (2006.01)
*G02B 6/00* (2006.01)
(Continued)

(52) U.S. Cl.
CPC ........... *G02B 27/0172* (2013.01); *G02B 6/00* (2013.01); *G02B 27/0101* (2013.01);
(Continued)

(58) Field of Classification Search
CPC ...... G02B 27/01; G02B 24/0172; G02B 6/00; G02B 27/0172
See application file for complete search history.

(56) References Cited

U.S. PATENT DOCUMENTS 5,917,459 A 6/1999 Son et al.
6,124,977 A 9/2000 Takahashi
(Continued)

FOREIGN PATENT DOCUMENTS

CN 101331775 A 12/2008
CN 101477295 A 7/2009
(Continued)

OTHER PUBLICATIONS

US 8,792,178 B2, 07/2014, Totani et al. (withdrawn)
(Continued)

*Primary Examiner* — William Boddie
*Assistant Examiner* — Andrew B Schnirel
(74) *Attorney, Agent, or Firm* — Sughrue Mion, PLLC

(57) ABSTRACT

Provided are a wearable display device and a light guide element thereof, the display device including: a display element configured to project a first light forming a virtual image; and a light guide element configured to guide the first light from the display element and a second light input from outside of the wearable display device to a predetermined position. The light guide element includes: a first optical surface facing the display element; a second optical surface and a third optical surface configured to reflect the first light input through the first optical surface; and a fourth optical surface configured to reflect the reflected first light to the predetermined position. The first to third optical surfaces are flat surfaces, and the fourth optical surface is a rotationally asymmetric reflective surface.

23 Claims, 23 Drawing Sheets

(51) Int. Cl.
*G06F 3/04842* (2022.01)
*G06F 3/01* (2006.01)
*G06V 40/12* (2022.01)

(52) U.S. Cl.
CPC .......... *G06F 3/013* (2013.01); *G06F 3/04842* (2013.01); *G02B 2027/011* (2013.01); *G02B 2027/014* (2013.01); *G02B 2027/0118* (2013.01); *G02B 2027/0138* (2013.01); *G02B 2027/0147* (2013.01); *G02B 2027/0178* (2013.01); *G06V 40/12* (2022.01)

(56) References Cited

U.S. PATENT DOCUMENTS

| | | | |
|---|---|---|---|
| 7,253,960 | B2 | 8/2007 | Yamazaki et al. |
| 7,656,585 | B1 | 2/2010 | Powell et al. |
| 7,999,982 | B2 | 8/2011 | Endo et al. |
| 8,472,119 | B1 | 6/2013 | Kelly |
| 2004/0233488 | A1 | 11/2004 | Kasai et al. |
| 2004/0257663 | A1 | 12/2004 | Edelmann |
| 2005/0254107 | A1 | 11/2005 | Amanai |
| 2007/0019264 | A1 | 1/2007 | Tanijiri et al. |
| 2007/0132953 | A1 | 6/2007 | Silverstein |
| 2008/0002262 | A1 | 1/2008 | Chirieleison |
| 2008/0094586 | A1 | 4/2008 | Hirayama |
| 2009/0231687 | A1 | 9/2009 | Yamamoto |
| 2010/0157433 | A1 | 6/2010 | Mukawa et al. |
| 2011/0175799 | A1 | 7/2011 | Yamada et al. |
| 2011/0221656 | A1 | 9/2011 | Haddick et al. |
| 2012/0075168 | A1 | 3/2012 | Osterhout et al. |
| 2012/0127062 | A1 | 5/2012 | Bar-Zeev et al. |
| 2012/0242561 | A1 | 9/2012 | Sugihara |
| 2013/0033756 | A1 | 2/2013 | Spitzer et al. |
| 2013/0134301 | A1 | 5/2013 | Takahashi |
| 2013/0141527 | A1 | 6/2013 | Shimizu et al. |
| 2013/0182334 | A1 | 7/2013 | Sugihara et al. |
| 2013/0278497 | A1* | 10/2013 | Takagi .................... G06F 3/012 345/156 |
| 2014/0340286 | A1 | 11/2014 | Machida et al. |
| 2015/0062000 | A1* | 3/2015 | Saito ...................... G06F 3/011 345/156 |
| 2016/0198951 | A1* | 7/2016 | Fujino .................. A61B 3/0091 351/206 |

FOREIGN PATENT DOCUMENTS

| | | |
|---|---|---|
| CN | 102906623 A | 1/2013 |
| JP | 11-142783 A | 5/1999 |
| JP | 2001-264683 A | 9/2001 |
| JP | 2005-202060 A | 7/2005 |
| JP | 2007-286317 A | 11/2007 |
| JP | 2008-61052 A | 3/2008 |
| JP | 2012-63637 A | 3/2012 |
| JP | 2012-168427 A | 9/2012 |
| KR | 100206688 B1 | 7/1999 |
| KR | 10-2013-0000401 A | 1/2013 |
| WO | 2010/032700 A1 | 3/2010 |
| WO | 2011/106798 A1 | 9/2011 |
| WO | 2013111471 A1 | 8/2013 |

OTHER PUBLICATIONS

Communication dated Feb. 26, 2021 by the Korean Intellectual Property Office in corresponding Korean Application No. 10-2014-0177758.
Communication dated Apr. 16, 2020 from the European Patent Office in application No. 20157507.3.
Morimoto, C.H., et al., "Pupil detection and tracking using multiple light sources", Image and Vision Computing, vol. 18, No. 4, Mar. 1, 2000, XP055680189, pp. 331-335.
Communication dated Nov. 16, 2017, from the State Intellectual Property Office of People's Republic of China in counterpart Application No. 201580004275.5.
Communication dated Nov. 3, 2017, from the European Patent Office in counterpart European Application No. 15735288.1.
Search Report dated Mar. 16, 2015 by the International Searching Authority in related Application No. PCT/KR2015/000183.
Written Opinion dated Mar. 16, 2015 by the International Searching Authority in related Application No. PCT/KR2015/000183.
Communication dated May 20, 2021, from The China National Intellectual Property Administration in Application No. 201911147620.7.
Communication dated Aug. 17, 2021, issued by the Korean Intellectual Property Office in Korean Application No. 10-2014-0177758.

* cited by examiner

WEARABLE DISPLAY APPARATUS HAVING A LIGHT GUIDE ELEMENT THAT GUIDES LIGHT FROM A DISPLAY ELEMENT AND LIGHT FROM AN OUTSIDE

CROSS-REFERENCE TO RELATED APPLICATIONS

This application is a Continuation Application of U.S. application Ser. No. 14/593,634, filed Jan. 9, 2015, which claims priority from Korean Patent Application Serial No. 10-2014-0002899, filed on Jan. 9, 2014 in the Korean Intellectual Property Office, and from Korean Application Serial No. 10-2014-0177758, filed on Dec. 10, 2014 in the Korean Intellectual Property Office, the entire contents of which are hereby incorporated by reference.

BACKGROUND

1. Field

Apparatuses and methods consistent with exemplary embodiments relate to a wearable display device.

2. Description of the Related Art

Some commercially available body-wearable display devices may include an input/output (I/O) device configured to be worn on a part of a body, and a main circuit device or a battery configured as a separate module type. The circuit device or the battery configured as the separated module type may be connected to the I/O device through a wire. Since an electronic device of this type is inconvenient to carry and use, the electronic device may mainly be used in a limited environment, for example, indoors.

Head-wearable display devices are classified as a video see-through type or an optical see-through type according to constructions of displays that output image information. The video see-through type refers to a type of head-wearable display device that synthesizes an image obtained through a camera and image information provided from a computer to provide the image and image information to a user in a synthesized form. The video see-through type has a problem in that since the user is to recognize surroundings based on only the image obtained through the camera, the user may be isolated from a real surrounding environment.

Meanwhile, the optical see-through type refers to a type of head-wearable display device that projects virtual image information provided from a computer to a surrounding environment directly recognized by the user, thereby allowing the user to be in harmony with the surrounding environment. However, the optical see-through type has a problem in that the resolution of the virtual image information may be considerably changed depending on a luminous intensity. Of course, the resolution of the virtual image information may be forcibly set to be high. However, this is not desirable for a portable electronic device since the consumption of power increases at the high resolution. Additionally, the related art optical see-through type display devices have problems in that they are thick, are poor in image quality due to occurrence of aberrations, have a complicated manufacturing process, are heavy, and so on.

SUMMARY

An object of at least one exemplary embodiment is to solve, alleviate or remove least one of the problems and/or disadvantages described above.

Aspects of one or more exemplary embodiments provide a compact and light wearable display device in which an aberration by a manufacturing tolerance occurs less often.

According to an aspect of an exemplary embodiment, there is provided a wearable display device including: a display element configured to project a first light forming a virtual image; and a light guide element configured to guide the first light from the display element and a second light input from outside of the wearable display device to a predetermined position, wherein the light guide element includes: a first optical surface through which the first light from the display element is input; a second optical surface configured to reflect the first light input through the first optical surface; a third optical surface configured to reflect the first light input through the first optical surface; and a fourth optical surface configured to reflect the reflected first light, reflected by the second optical surface and the third optical surface, to the predetermined position, wherein the first optical surface, the second optical surface, and the third optical surface are flat surfaces, and wherein the fourth optical surface is a rotationally asymmetric reflective surface.

A distance between an apex of the fourth optical surface and the third optical surface may be less than one half of a distance between the second optical surface and the third optical surface.

The second optical surface and the third optical surface may be parallel to each other; and the fourth optical surface may be inclined with respect to a direction perpendicular to the second optical surface and the third optical surface.

The fourth optical surface may transmit some of the first light, and reflect a remainder of the first light to the predetermined position.

A chief ray of the first light may be totally reflected 2n times, where n is a natural number, by the second optical surface and the third optical surface.

The wearable display device may further include a lens system between the first optical surface and the display element and configured to refract the first light projected from the display element.

An angle between the second optical surface and the first optical surface may not be equal to an angle between the second optical surface and a surface of the display element.

The light guide element may further include: a light guide portion including the first optical surface, the second optical surface, the third optical surface, and the fourth optical surface, and a compensation portion bonded to the fourth optical surface of the light guide portion, wherein the light guide portion and the compensation portion may have powers that have opposite signs and a same absolute value.

The light guide element may further include: a body between the second optical surface and the third optical surface and having a constant thickness; a first portion between the first optical surface and the second optical surface and having a thickness that gradually increases towards the display element; and a second portion between the third optical surface and the fourth optical surface and having a thickness that gradually decreases in a direction away from the display element.

The light guide element may further include: a body between the second optical surface and the third optical surface and having a constant thickness; a first portion between the first optical surface and the second optical surface and having a thickness that gradually decreases towards the display element; and a second portion between the third optical surface and the fourth optical surface and having a thickness that gradually decreases in a direction away from the display element.

The wearable display device may further include: a first window and a second window on a front side of the wearable display device; and a controller that controls transmissivities of the first window and the second window.

The controller may be configured to control the transmissivities of the first window and the second window by controlling a voltage applied to the first window and the second window.

The controller may be configured to control the transmissivities of the first window and the second window according to a luminous intensity of a surrounding environment.

The wearable display device may further include a sensor configured to measure the luminous intensity of the surrounding environment.

The wearable display device may further include a touch sensor configured to sense at least one of a touch and a hovering gesture.

The touch sensor may be configured to recognize a fingerprint; and the wearable display device may further include a controller configured to, when first fingerprint data is input through the touch sensor, compare the first fingerprint data and second fingerprint data that is previously stored and to, when the first fingerprint data and the second fingerprint data correspond to each other according to the comparing, perform a function mapped to the second fingerprint data.

The mapped function may be one of an unlock function, an application execution function, a user account change function, and a multimedia control function.

The wearable display device may further include: a communicator configured to receive touch information from an external electronic device; and a controller configured to change, according to the received touch information, a virtual image displayed on the wearable display device to another virtual image.

The wearable display device may further include: a first camera configured to capture an image of a front subject with reference to a position of the light guide element; a second camera configured to capture an image of a lower subject with reference to the position of the light guide element; and a controller configured to recognize a hand or a finger from the image captured through the second camera, and to change a virtual image displayed on the wearable display device to another virtual image according to a gesture of the recognized hand or the recognized finger.

The wearable display device may further include a light shielding member on the second optical surface or the third optical surface to absorb some of the first light or to extract some of the first light to an outside of the light guide element.

The wearable display device may further include an actuator configured to move the light guide element.

The wearable display device may further include: a light source configured to output a third light towards the predetermined position; and an image sensor configured to receive a reflected portion of the third light through the light guide element.

The wearable display device may further include at least one actuator configured to move the light guide element and the image sensor together.

The wearable display device may further include a transparent cover glass on a surface of the display element facing the light guide element, to protect the surface of the display element.

According to an aspect of another exemplary embodiment, there is provided a light guide element for a display device, the light guide element including: a first optical surface configured to receive first light from a display element of the display device; a second optical surface configured to reflect the first light received through the first optical surface; a third optical surface configured to reflect the first light input received through the first optical surface; and a fourth optical surface configured to reflect the reflected first light, reflected by the second optical surface and the third optical surface, toward a predetermined position to form a virtual image, and to transmit a second light input from an outside toward the predetermined position, wherein the first optical surface, the second optical surface, and the third optical surface are flat surfaces, and wherein the fourth optical surface is a rotationally asymmetric reflective surface.

A distance between an apex of the fourth optical surface and the third optical surface may be less than one half of a distance between the second optical surface and the third optical surface.

The second optical surface and the third optical surface may be parallel to each other; and the fourth optical surface may be inclined with respect to a direction perpendicular to the second optical surface and the third optical surface.

The fourth optical surface may transmit some of the first light, and reflect a remainder of the first light toward the predetermined position.

A chief ray of the first light may be totally reflected 2n times, where n is a natural number, by the second optical surface and the third optical surface.

The light guide element may further include: a light guide portion including the first optical surface, the second optical surface, the third optical surface, and the fourth optical surface; and a compensation portion connected to the fourth optical surface of the light guide portion, wherein the light guide portion and the compensation portion may have powers that have opposite signs and a same absolute value.

The light guide element may further include: a body between the second optical surface and the third optical surface and having a constant thickness; a first portion between the first optical surface and the second optical surface and having a thickness that gradually increases towards the display element; and a second portion between the third optical surface and the fourth optical surface and having a thickness that gradually decreases in a direction away from the display element.

The light guide element may further include: a body between the second optical surface and the third optical surface and having a constant thickness; a first portion between the first optical surface and the second optical surface and having a thickness that gradually decreases towards the display element; and a second portion between the third optical surface and the fourth optical surface and having a thickness that gradually decreases in a direction away from the display element.

The light guide element may further include a light shielding member on the second optical surface or the third optical surface to absorb some of the first light or to extract some of the first light to an outside of the light guide element.

According to an aspect of another exemplary embodiment, there is provided a display device including: a display element configured to output a first light forming a virtual image; and a light guide element configured to guide the first light from the display element toward a predetermined position, wherein the light guide element includes: a first optical surface through which the first light from the display element is input; a second optical surface configured to reflect the first light input through the first optical surface; a third optical surface configured to reflect the first light input through the first optical surface; and a fourth optical surface configured to reflect the reflected first light, reflected by the second optical surface and the third optical surface, to the predetermined position, wherein the fourth optical surface is a rotationally asymmetric reflective surface.

A distance between an apex of the fourth optical surface and the third optical surface may be less than one half of a distance between the second optical surface and the third optical surface.

The second optical surface and the third optical surface may be parallel to each other; and the fourth optical surface may be inclined with respect to a direction perpendicular to the second optical surface and the third optical surface.

The fourth optical surface may transmit some of the first light, and reflect a remainder of the first light to the predetermined position.

A chief ray of the first light may be reflected 2n times, where n is a natural number, by the second optical surface and the third optical surface.

BRIEF DESCRIPTION OF THE DRAWINGS

The above and other aspects, features, and advantages will be more apparent from the following detailed description taken in conjunction with the accompanying drawings, in which.

DETAILED DESCRIPTION OF EXEMPLARY EMBODIMENTS

Figure 1:
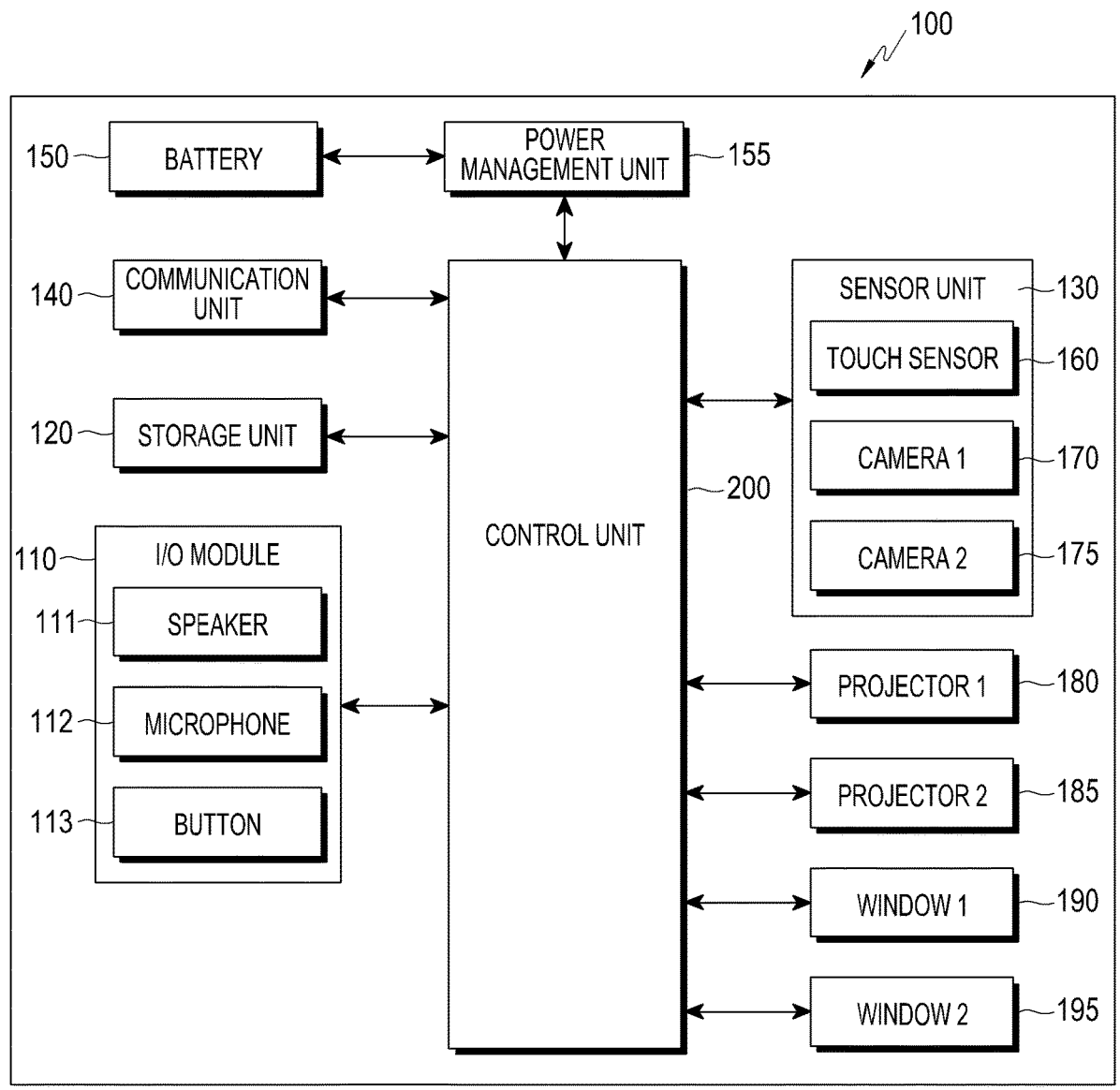
FIG. 1 is a view illustrating a configuration of a display device according to an exemplary embodiment.

The present disclosure may be variously changed and may have various exemplary embodiments. Exemplary embodiments exemplified in the drawings will be described in detail below. However, it should be understood that the present disclosure is not limited to these exemplary embodiments, but the present disclosure includes all modifications, equivalents, and alternatives within the spirit and the scope of the present disclosure.

Although the terms including an ordinal number such as first, second, etc., can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element. As used herein, the term "and/or" includes any and all combinations of one or more associated items. the term "at least one of", when preceding a list of elements, represents any or a partial or whole combination of the elements.

The terms used in this application are for the purpose of describing exemplary embodiments only and is not intended to limit the inventive concept. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

Furthermore, in the description of exemplary embodiments, a "module" or a "unit" may perform at least one function or operation and may be embodied as hardware or software or as a combination of hardware and software. Also, a plurality of "modules" or a plurality of "units" may be integrated into at least one module except a "module" or a "unit" that may be embodied as particular hardware, to be embodied as at least one processor.

FIG. 1 is a view illustrating a configuration of a display device 100 according to an exemplary embodiment.

A display device 100 includes an input/output (I/O) module 110, a storage unit 120 (e.g., storage), a sensor unit 130 (e.g., sensor), a communication unit 140 (e.g., communicator), a battery 150, a power management unit 155 (e.g., power manager), a first projector 180, a second projector 185, a first window 190, a second window 195, and a control unit 200 (e.g., controller). The sensor unit 130 includes a touch sensor 160, a first camera 170, and a second camera 175.

The I/O module 110 is configured to receive a user input, relay or inform of the user input, receive data from the outside, and/or output data to the outside. The I/O module 110 may include at least one speaker 111, at least one microphone 112, at least one button 113, a connector, a keypad, or a combination thereof, though it is understood that one or more other exemplary embodiments are not limited thereto.

The speaker 111 may output sounds corresponding to various data (e.g., wireless data, broadcasting data, a digital audio file, a digital video file, photographing, etc.) to the outside of the display device 100 according to a control of the control unit 200. The speaker 111 may output a sound corresponding to a function (i.e., operation) performed by the display device 100. One speaker 111 or two or more speakers 111 may be disposed at one position or two or more positions in the housing of the display device 100.

The microphone 112 receives or captures a voice or a sound from the outside of the display device 100 to generate an electric signal, and outputs the generated signal to the control unit 200. One microphone 112 or two or more microphones 112 may be disposed at one position or two or more positions in the housing of the display device 100. Herein, a signal may be referred to as data or information, or the data may be referred to as a data signal.

The button 113 is provided to receive a user input, and may be used for turning ON/OFF the display device 100, selecting and/or retrieving a menu item or an item, etc. The button 113 may include at least one of a power button, a volume button, a menu button, a home button, a back button, retrieval buttons (a leftward button, a rightward button, an upward button, a downward button, etc.), or a combination thereof. One button 113 or two or more buttons 113 may be disposed at one position or two or more positions on the housing of the display device 100.

The connector may be used as an interface for interconnecting the display device 100 and an external electronic device or a power source. The connector may be connected to a connector of the external electronic device or the power source directly or via a wired cable. Through the connector connection, the control unit 200 may transmit data stored in the storage unit 120 to the electronic device or receive data from the electronic device. In addition, the display device 100 may receive power from a power source via the wired cable connected to the connector to charge the battery 150.

The keypad may receive a key input from the user to control the display device 100. The keypad may include at least one of a physical keypad disposed on the display device 100, a virtual keypad displayed by a first projector 180 and/or a second projector 185, etc.

The sensor unit 130 includes at least one sensor that detects a state of the display device 100 or a state of a surrounding environment. For example, the sensor unit 130 may include a proximity sensor that detects whether the user approaches the display device 100 or not, a motion/azimuth sensor that detects a movement of the display device 100 (e.g., rotation, acceleration, deceleration, or vibration of the display device 100), an illumination sensor that detects a peripheral luminous intensity, first and second cameras that photograph a subject, a touch sensor that senses a user's touch or hovering gesture, or a combination thereof. In addition, the motion/azimuth sensor may include at least one of an acceleration sensor, a gravity sensor, a geomagnetic sensor, a gyro sensor, an impact sensor, a global positioning system (GPS) module, and a compass sensor. The sensor unit 130 may detect a state of the display device 100 to transmit a signal representing the state of the display device 100 to the control unit 200. For example, the GPS module may receive electromagnetic waves from a plurality of GPS satellites in orbit around the earth and calculate the position of the display device 100 using the time of arrival from a GPS satellite to the display device 100. The compass sensor calculates the posture or azimuth of the display device 100.

The touch sensor 160 may transmit a signal corresponding to at least one touch input to the control unit 200. The user may touch the touch sensor 160 using a part of the user's body (e.g., a finger) or any other touch input mechanism, method, or device, and the touch sensor 160 may receive the user's touch input. In addition, the touch sensor 160 may receive an input according to a continuous movement of touch (i.e., a drag input). The touch input information may include a touch coordinate and/or a touch state. The touch state may be a mouse down state (e.g., a click state, an input state, etc.) where the touch sensor 160 is pushed, a mouse up state (e.g., a release state) where a finger is released from the touch sensor 160, a drag state where the finger or a touch input mechanism is slid on the touch sensor 160 in a state where the touch sensor 160 is pushed. The control unit 200 determines selection or movement of a menu item or an item, and user input information such as a writing input from the touch input information, and performs a function corresponding to the user input information (e.g., phone connection, camera photographing, message writing/view, or data transmission).

In the present exemplary embodiment, the touch is not limited to a contact between the touch sensor 160 and the touch input mechanism, but may include a non-contact input (e.g., when the touch sensor 160 and the touch input mechanism are spaced apart from each other). Such a non-contact touch input may be referred to as a hovering or hover input or may be referred to as a gesture input. The touch sensor 160 may be implemented in a resistive type, a capacitive type, an infrared type, an acoustic wave type, an ElectroMagnetic Resonance (EMR) type, or a combination thereof.

The touch sensor 160 may have a fingerprint sensing function so that when a user's finger comes in contact with the surface of the touch sensor 160, the touch sensor 160 generates fingerprint information corresponding to the fingerprint pattern of the finger. In addition, the touch sensor 160 may have a switch structure to generate push sensing data according to the user's pushing. The touch sensor 160 outputs the generated fingerprint data and/or push sensing data to the control unit 200. Alternatively or additionally, the touch sensor 160 may sense the user's fingerprint input direction to generate fingerprint input direction data, and output the generated fingerprint input direction data to the control unit 200. That is, the fingerprint information may include at least one of fingerprint pattern information, push sensing data, and fingerprint input direction information.

The control unit 200 may recognize the user's fingerprint from the fingerprint information received from the touch sensor 160. The control unit 200 may map and store at least one fingerprint and at least one executable function or corresponding user in the storage unit 120. In addition, the storage unit 120 may store fingerprint information of a previously registered user, and the control unit 200 may retrieve the fingerprint information matched with the fingerprint information received from the touch sensor 160 in the storage unit 120 to determine the user or function mapped to the retrieved fingerprint information. When the function is mapped to the retrieved finger information, the control unit 200 may execute the mapped function.

The executable function may be, for example, an unlock function, an application execution function, a user account change function, a multimedia control function, an application task or process execution function, a mode switch or setting function, a parameter control function (e.g., volume, brightness, zoom, application setting, notification setting, etc.), etc.

The unlock function refers to a function of releasing a locking of the display device 100 through a fingerprint input. For example, when a user input is not received for a predetermined length of time, the control unit 200 may restrict the function execution of the display device 100. The unlock function refers to a function of releasing the function execution restriction. The application execution function refers to a function that executes, for example, a game application, a social networking service (SNS) application, a document preparation application, a multimedia application, etc., or executes, for example, a phone application or a message application to perform a function of automatically connecting to a previously set contact point. The user account change function refers to a function of selecting one of a plurality of user accounts. The multimedia control function refers to a function of displaying, for example, a volume control menu or a reproduction menu, or a function of performing a volume control such as volume-increasing, volume-decreasing or mute, or a multimedia control such as rewind, fast rewind, temporary stop, or reproduction.

Each of the first and second cameras 170 and 175 may include a lens system and an image sensor, and may further include, for example, a flash device. Each of the first and second cameras 170 and 175 may convert a light input through the lens system (or captured or photographed) into an electric image signal (e.g., a digital image) to output the converted image signal to the control unit 200. Furthermore, a user may photograph or capture a video picture or a still image through each of the cameras 170 and 175. In addition, each of the cameras 170 and 175 may be provided to receive a user input by the user's motion or gesture.

The lens system allows the light input from the outside to converge to form an image of a subject. The lens system may include one or more lenses, in which each of the lenses may be, for example, a convex lens, an aspheric lens, etc. The lens system is symmetric with respect to an optical axis that passes the center thereof and the optical axis is defined as the central axis. The image sensor detects an optical image formed by an external light input through the lens system as an electric image signal. The image sensor includes a plurality of pixel units arranged in an M×N matrix structure, in which each pixel unit may include a photodiode and a plurality of transistors (e.g., a 2T pixel, a 3T pixel, a 4T pixel, a 5T pixel, etc.). The pixel units accumulate charges generated by input light, and the voltage generated by the accumulated charges represents a luminous intensity of the input light. In a case where a still image or an image of a video picture is processed, an image signal output from the image sensor is configured by a set of voltages output from the pixel units (that is, pixel values), and the image signal represents one frame (that is, a still image). In addition, the frame includes M×N pixels. As the image sensor, for example, a Charge-Coupled Device (CCD) image sensor, a Complementary Metal-oxide Semiconductor (CMOS) image sensor, etc., may be used.

The image sensor may operate all the pixels of the image sensor or only the pixels of an interest region among all the pixels, in which the image data output from the pixels is output to the control unit 200.

The first camera 170 may be used for photographing and recognizing a front subject with reference to (e.g., relative to) the position of a user's eye. The second camera 175 may be used for photographing a lower subject (e.g., the user's hand) with reference to the position of the user's eye.

The second camera 175 may be an infrared camera, and the second camera 175 may include an infrared light source that outputs infrared rays, and an image sensor that detects the infrared rays reflected from the subject and converts the detected infrared rays into an electric image signal or data (e.g., a digital image) to output the converted electric image signal or data.

The communication unit 140 may be a wired, wireless, or wired/wireless communication unit. The communication unit 140 transmits data from the control unit 200 wiredly or wirelessly or to an electronic device through an external communication network and the atmosphere, or receives data from an electronic device wiredly or wirelessly through the external communication network or the atmosphere and transmits the data to the control unit 200.

The communication unit 140 may include at least one of a mobile communication module (e.g., mobile communication transmitter or transceiver), a wireless Local Area Network (LAN) module (e.g., LAN transmitter or transceiver), and a short range communication module (e.g., short range communication transmitter or transceiver) depending on the performance thereof.

The mobile communication module allows the display device 100 to communicate with an electronic device through a mobile communication network using at least one antenna according to a control of the control unit 200. The mobile communication module transmits or receives a wireless signal for a voice call, a video call, a Short Message Service (SMS) or a Multimedia Message Service (MIMS) with a portable phone, a smart phone, a tablet personal computer (PC), or any other communication device that has a network address such as an Internet Protocol (IP) or a phone number.

The wireless LAN module may be connected to the Internet via, for example, an Access Point (AP) according to a control of the control unit 200. The wireless LAN module supports the wireless LAN standard (IEEE802.11x) of the Institute of Electrical and Electronics Engineers (IEEE).

The short range communication module may perform short range communication with an external short range communication device according to a control of the control unit 200. The short range communication method may be Bluetooth, Infrared Data Association (IrDA), WiFi-Direct communication, Near Field Communication (NFC), or a combination thereof.

The power management unit 155 may supply power to the display device 100 according to a control of the control unit 200. The power management unit 155 may be connected to one battery 150 or two or more batteries 150. In addition, the power management unit 155 may supply the power input from an external power source to the display device 100 through a wired cable connected to a connector.

The control unit 200 may process a Graphic User Interface (GUI) by the frame unit using an image from the cameras 170 and 175, an image stored in the storage unit 120, or data stored in the storage unit 120, and may output an image frame converted to be suitable for screen output characteristics (e.g., a size, a quality of image, and a resolution) of the first projector 180 and/or the second projector 185) to the outside through the first projector 180 and/or the second projector 185 or store the image frame in the storage unit 120. Hereinafter, while a GUI is specifically described as an example of a virtual image formed by the first projector 180 and/or the second projector 185 in the present disclosure, the GUI is an example of a "virtual image", and the term "virtual image" may be used in a sense of including (or displaying) a virtual object that is not a real object, such as a GUI or a still image.

The control unit 200 may provide virtual images corresponding to various services (e.g., phone call, data transmission, broadcasting, photographing, etc.) to the user through the first projector 180 and/or the second projector 185. In addition, the control unit 200 may provide a still image or a video picture to the user through the virtual image. That is, in the present disclosure, the virtual image may represent a screen expressed as a still image or a video picture.

The first and second projectors 180 and 185 have the same or similar configuration, and each of the projectors 180 and 185 projects lights that form the virtual image, which is provided by the control unit 200, to the user's eye or eyes. According to one or more other exemplary embodiments, more than two projectors may be included, or a single projector may be included. In the case of a single projector, the single projector may project light to various regions.

The first and second windows 190 and 195 are disposed on the front side of the display device 100 and have the same or similar configuration. Each of the windows 190 and 195 has transmissivity which is changed according to a control of the control unit 200. According to one or more other exemplary embodiments, more than two windows may be included, or a single window may be included. In the case of a single window, the single window may be divided into one or more regions.

The control unit 200 controls the overall operation of the display device 100 and controls other components in the display device 100 to perform a virtual image providing method. The control unit 200 may include a single core processor, a dual core processor, a triple core processor, a quad core processor, a multi-core processor, etc. The control unit 200 may receive a broadcasting signal (e.g., a television (TV) broadcasting signal, a radio broadcasting signal, a data broadcasting signal, etc.) transmitted from a broadcasting station and additional broadcasting information (e.g., an Electronic Program Guide (EPG), an Electronic Service Guide (ESG), etc.). Alternatively or additionally, the control unit 200 may reproduce a digital audio signal (e.g., a file having a file extension of mp3, wma, ogg, wav, etc.) stored in the storage unit 120 or received through the communication unit 140, through the speaker 111. In addition, the control unit 200 may reproduce a digital video file (e.g., a file having a file extension of mpeg, mpg, mp4, avi, mov, mkv, etc.) stored in the storage unit 120 or received through the communication unit 140, through the first projector 180 and/or the second projector 185. The control unit 200 may display image data (e.g., a GUI), which is configured, obtained, or generated by the control unit 200 using data stored in the storage unit 120 or received from the communication unit 140 according to a user command, a menu item, an icon selection, event information which is input through the sensor unit 130 or the I/O module 110, etc., to the user through the first projector 180 and/or the second projector 185. At this time, the image may be a still image or a video picture.

Figure 2:
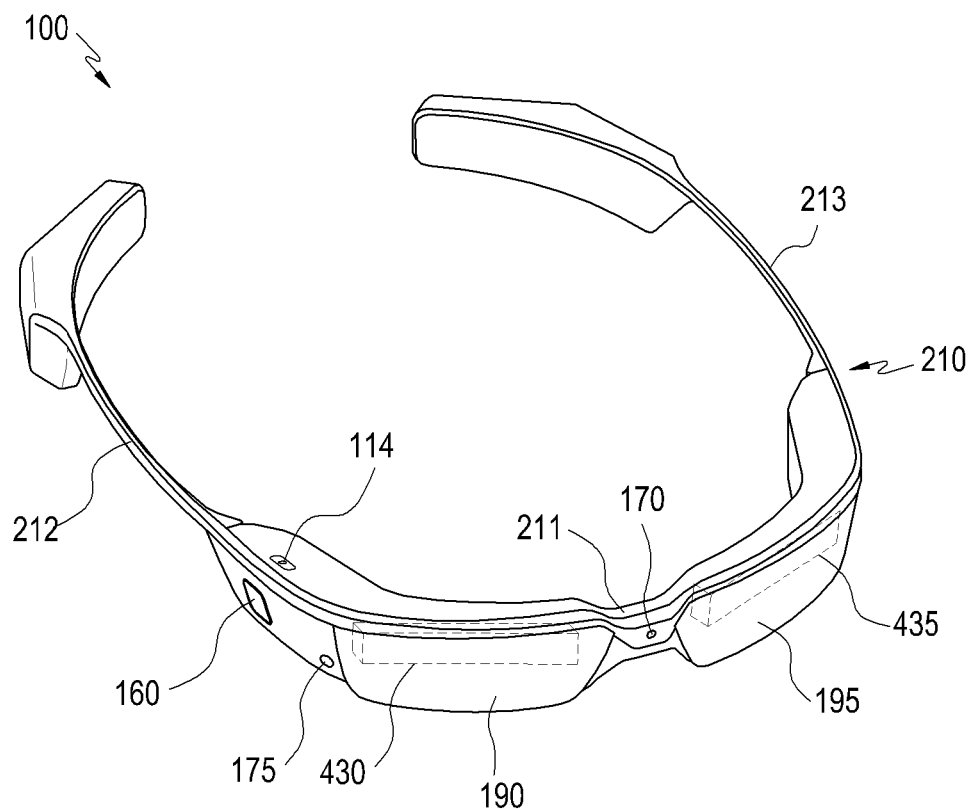
FIG. 2 is a perspective view illustrating an external appearance of a display device according to an exemplary embodiment.

FIG. 2 is a perspective view illustrating an external appearance of a display device 100 according to an exemplary embodiment.

The display device 100 may be a portable terminal (or a portable communication terminal) or a wearable device having, for example, an eyeglass appearance in general. The display device 100 has a housing 210 forming the outer surface of the display device 100, and the components of the display device 100 illustrated in FIG. 1 are mounted inside of the housing 210 or installed in the housing 210 to be partly exposed to the outside.

The housing 210 includes a front frame 211 to which first and second windows 190 and 195 are fixed to correspond to left and right eyes, respectively, and first and second temple frames 212 and 213 extending from the opposite ends of the front frame 211. According to another exemplary embodiment, the display device may not include first and second temple frames 212 and 213, but may include a front frame 211 attachable to another housing or frame. Furthermore, according to various exemplary embodiments, the front frame 211 and the first and second temple frames 212 and 213 may be integrally provided, or provided as distinct items that are connectible. Hereinafter, the right eye and the left eye may be referred to as a first eye and a left eye, respectively. In the present disclosure, the first and second windows 190 and 195 may be referred to as first and second window panels.

On the outer surface of the front frame 211, a first camera 170, a second camera 175, a power button 114, and a touch sensor 160 are disposed.

The first camera 170 is disposed on a portion of the front frame 211 between the first and second windows 190 and 195 (that is, the portion that corresponds to a bridge in an ordinary eyeglasses). However, it is understood that one or more other exemplary embodiments are not limited thereto, and the first camera 170 may be disposed in adjacent (e.g., above or next to) the first window 190 or the second window 195.

The second camera 175 and the touch sensor 160 are disposed on a side surface of the front frame 211. However, it is understood that one or more other exemplary embodiments are not limited thereto. For example, according to another exemplary embodiment, the touch sensor 160 may be disposed on another side surface or another surface of the front frame 211 or a different frame.

On the top surface of the front frame 211, a power button 114 is disposed to turn ON/OFF the power of the display device 100. However, it is understood that one or more other exemplary embodiments are not limited thereto. For example, according to another exemplary embodiment, the power button 114 may be disposed on a side surface of the front frame 211 or at a different portion of the display device 100.

A first light guide member 430 of the first projector 180 is disposed between the user's right eye and the first window 190, and a second light guide member 435 of the second projector 185 is disposed between the user's left eye and the second window 195.

Hereinafter, a configuration of the first window 190 will be described as a representative example of the first and second windows 190 and 195.

Figure 3:
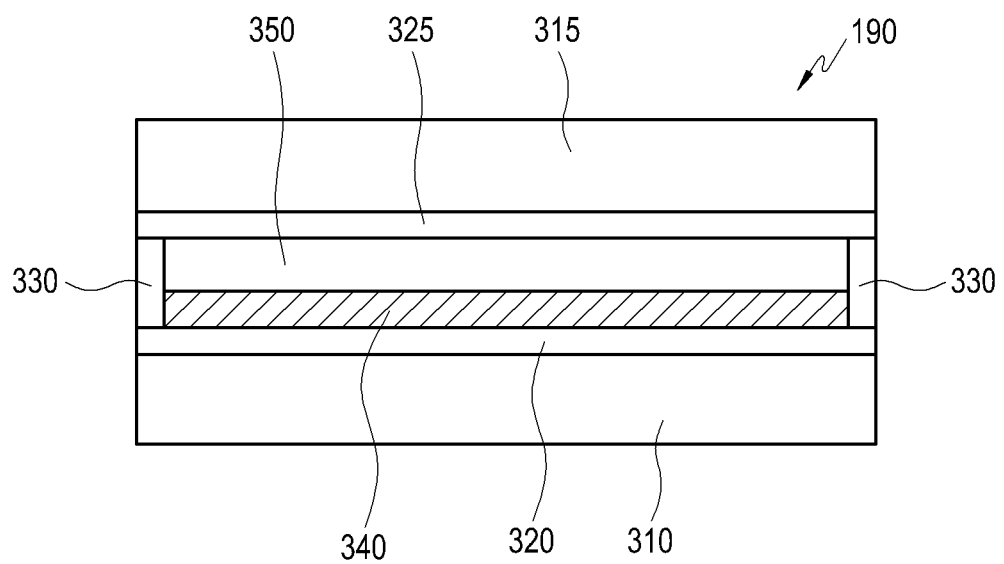
FIG. 3 illustrates a configuration of a first window according to an exemplary embodiment.

FIG. 3 illustrates a configuration of a first window 190 according to an exemplary embodiment. The first window 190 has a characteristic in which its transmissivity (i.e., transmittance) is changed by a signal or voltage applied by the control unit 200.

The first window 190 may be, for example, an electrochromic glass, a Suspended Particle Device (SPD), or a Liquid Crystal (LC). However, it is understood that one or more other exemplary embodiments are not limited thereto. For example, according to another exemplary embodiment, the first window 190 may be a photochromic glass or a thermochromic glass that is not capable of being actively controlled by applying a signal and has a transmissivity that is changed by reacting with a light having a predetermined frequency, or a change of temperature.

The first window 190 may be fabricated through various methods, for example, by coating a transmissivity-controllable substance on glass, or attaching a transmissivity-controllable thin film to glass.

In the present exemplary embodiment, the electrochromic glass is used as the first window 190.

The first window 190 includes a first insulating substrate 310, a second insulating substrate 315, a first conductive electrode 320 laminated on the top surface of the first insulating substrate 310, a second conductive electrode 325 laminated on the bottom surface of the second insulating substrate 315, an insulating spacer 330 that isolates the first and second insulating substrates 310 and 315 from each other and seals a space between the first and second insulating substrates 310 and 315, and an electrochromic layer 340 and an electrolyte 350 that are filled or included in the space between the first and second insulating substrates 310 and 315.

Each of the first and second insulating substrates 310 and 315 may be made of or include a transparent plastic, in which the plastic may be one of, for example, polyacrylate, polyethylene etherphthalate, polyethylene naphthalate, polycarbonate, polyarylate, polyetherimide, polyethersulfone, polyimide, etc.

The first conductive electrode 320 may be made of a transparent conductor, and may include, for example, an inorganic material such as Indium Tin oxide (ITO), Fluorine-doped Tin Oxide (FTO), Antimony-doped Tin Oxide (ATO), etc., or an organic conductive material such as polyacetylene, polythiophene, etc.

The second conductive electrode 325 may be made of a transparent or opaque conductive material, and may include, for example, at least one of ITO, FTO, a metal such as aluminum (Al), an ATO, etc.

The electrochromic layer 340, which includes an electrochromic material, is disposed on the first conductive electrode 320. The electrochromic layer 340 may be disposed on the first conductive electrode 320 in the form of a film.

The first insulating substrate 310 and the second insulating substrate 315 are fixed by the spacer 330, and a gap between the first insulating substrate 310 and the second insulating substrate 315 is filled with the electrolyte 350. The electrolyte 350 supplies an oxidation/reduction material that reacts with an electrochromic material. The electrolyte 350 may be a liquid electrolyte or a solid polymer electrolyte. A solution in which, for example, a lithium salt, such as LiOH or $LiClO_4$, a potassium salt, such as KOH, or a sodium salt, such as NaOH, is dissolved, may be used as the liquid electrolyte, though it is understood that one or more other exemplary embodiments are not limited thereto. The solid electrolyte may be, for example, (poly(2-acrylamino-2-methylpropane sulfonic acid), (poly(ethylene oxide), etc.

The material forming or included in the electrochromic layer 340, i.e., the electrochromic material, may include a metal-organic composite material in which a metal and an organic compound having a functional group capable of forming coordination with the metal are bonded to each other. The metal may include at least one of a light metal, a transition metal, a lanthanide metal, an alkali metal, etc. Specifically, the metal may include at least one of beryllium (Be), barium (Ba), copper (Cu), zinc (Zn), cesium (Ce), magnesium (Mg), aluminum (Al), titanium (Ti), etc. The functional group may include at least one of carboxyl group, pyridine group, imidazole group, etc. The organic compound may include at least one of a viologen derivative, an anthraquinone derivative, etc.

Hereinafter, a configuration of the first projector 180 will be described as a representative example of the first and second projectors 180 and 185.

Figure 4:
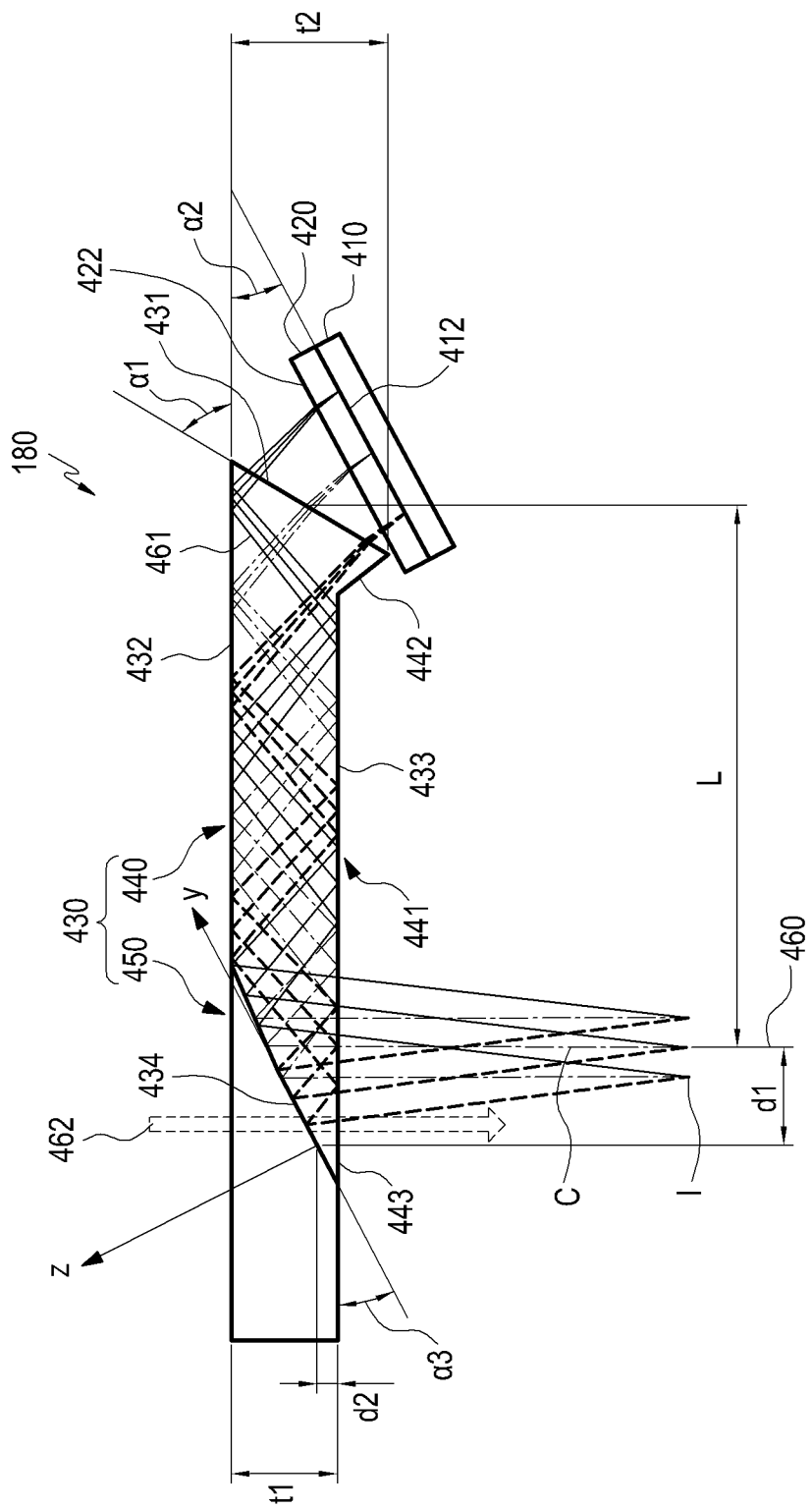
FIG. 4 illustrates a configuration of a first projector according to an exemplary embodiment.

FIG. 4 illustrates a configuration of a first projector 180 according to an exemplary embodiment.

The first projector 180 includes a display element 410, a transparent cover glass 420, and a transparent light guide element 430.

The display element 410 projects/outputs a light forming a virtual image to a light guide element 430. The display element 410 may have a rectangular flat plate shape, though it is understood that one or more other exemplary embodiments are not limited thereto and may have any of various shapes. The display element 410 displays an image by a pixel unit according to data input from the control unit 200. The display element 410 includes pixel elements corresponding to a pre-set resolution and displays the image by driving the pixel elements. For example, the display element 410 may include pixel elements arranged in an M×N (e.g., 1190×720 or 854×480) matrix structure. The display element 410 may be, for example, a Light Emitting Diode (LED), an Organic Light Emitting Diode (OLED), a Liquid Crystal Display (LCD), a liquid crystal on silicon (LCOS), etc.

The cover glass 420 is stacked or provided on the surface of the display element 410 so as to protect the surface of the display element 410. The cover glass 420 may have a rectangular flat plate shape, though it is understood that one or more other exemplary embodiments are not limited thereto and may have any of various shapes.

The light guide element 430 guides a light 461 input from the display element 410 to a fourth optical surface 434, which is a reflective surface positioned within the light guide element 430, through internal reflection. Furthermore, the light guide element 430 projects/outputs the light 461 reflected by the fourth optical surface 434 towards the user's eye, and causes a light 462 from the outside of the display device 100 (i.e., external light) to pass through the fourth optical surface 434 to be projected/output towards the user's eye. Hereinafter, the light 461 input from the display element 410 may be referred to as first light, and the light 462 input from the outside of the display device 100 may be referred to as second light.

The light guide element 430 has a prismatic shape and has first to fourth optical surfaces 431, 432, 433, and 434. The light guide element 430 includes a light guide portion 440 and a compensation portion 450, which are separated from each other by the fourth optical surface 434 that is a reflective surface. The light guide portion 440 on the display element 410 side of the light guide element 430 includes: a body 441 disposed between the second and third optical surfaces 432 and 433 and having a thickness that is constant along a visual axis 460 of the user's eye looking towards the front side (or a thickness in the widthwise direction of the light guide element 430); a first portion 442 disposed between the first and second optical surfaces 431 and 432 and having a thickness that gradually increases towards the display element; and a second portion 443 disposed between the third and fourth optical surfaces 433 and 434 and having a thickness that gradually decreases in a direction away from the display element 410. As described below, the visual axis 460 may be defined as an axis that is perpendicular to the second and third optical surfaces 432 and 433, which are parallel to each other, and passes the center or a center portion of the fourth optical surface 434.

The light guide element 430 may have a constant thickness in the remaining portion (i.e., the body 441), other than the opposite side portions (i.e., the first and second portions 442 and 443).

The first optical surface 431 faces the display element 410, and transmits the light 461 forming a virtual image incident/input from the display element 410 to the inside of the light guide element 430.

The second optical surface 432 faces the first window 190, and the third optical surface 433 faces the user's eye. The second and third optical surfaces 432 and 433 totally reflect the light 460, which passes through the first optical surface 431 to be transmitted to the inside of the light guide element 430, to travel to the fourth optical surface 434. That is, the transmitted light 461 is reflected from each of the second and third optical surfaces 432 and 433 without passing through the second and third optical surfaces 432 and 433.

The fourth optical surface 434 partially reflects some of the light 461 input thereto, and allows the remainder of the light 461 to pass through it. In addition, the fourth optical surface 434 allows some of the light 642 input thereto from the outside of the display device 100 to pass through it, and reflects the remainder of the light 462. The fourth optical surface 434 collimates and reflects the light 461 input thereto by being totally reflected by the second and third optical surfaces 432 and 433.

The first to third optical surfaces 431, 432, and 433 are flat faces and the fourth optical surface 434 is a rotationally asymmetric and aspheric surface.

The second and third optical surfaces 432 and 433 are parallel to each other and perpendicular to the visual axis 460 of the user's eye.

In order to reduce the thickness t1 of the body 441, the fourth optical surface 434 is positioned to be inclined in relation to the visual axis 460 of the user's eye. In order to reduce the astigmatism of the reflected light 461 that occurs due to the inclination, the fourth optical surface 434 is formed or provided as the rotationally asymmetric and aspherical face. For example, the fourth optical surface 434 may form an angle of 40 degrees or more with respect to the visual axis 460 of the user's eye.

The symbol "d2" indicates a distance from the apex of the fourth optical surface 434 along the visual axis 460 of the user's eye (the origin in the illustrated y-z coordinate axes) to the third optical surface 433. When the apex of the fourth optical surface 434 is positioned inside the light guide element 430 and a condition of d2<t1/2 is satisfied, the aberration of the reflected light 461 may be reduced and the thickness t1 of the body 441 may be reduced. When d2≥t1/2, the thickness t1 of the body 441 increases in order to reduce the aberration of the reflected light 461 so as not to exceed a pre-set threshold. When the apex of the fourth optical surface 434 does not exist inside the light guide element 430 (e.g., when d2≤0, i.e., when the apex is positioned below the third optical surface 433), it may be difficult to correctly measure the fourth optical surface 434, for example, when the light guide element 430 is manufactured through injection molding, and thus, it may be difficult to correct a mold for compensating a manufacturing tolerance. As a result, it may be difficult to reduce the aberration of the reflected light 461.

The symbol "L" indicates a distance between the center of the first optical surface 431 of the light guide element 430 and the center of the fourth optical surface 434 (or an intersection point of the visual axis 460 or a chief ray and the fourth optical surface 434). The distance L is set such that the light 461 directed or transmitted to the inside of the light guide element 430 is totally reflected by the second and third optical surfaces $2n$ times (where n is a natural number). The total reflection of the 2n times allows the display element 410 to be positioned closer to the user's eye with reference to the position of the second optical surface 432 according to the visual axis 460 of the user's eye so that the space protruding from the display device 100 outwardly in a direction away from the user's eye can be reduced. As a result, a visual volume (i.e., the volume of the display device 100 observed or perceived by other people) can be reduced.

The symbol "α1" indicates an angle formed between the second optical surface 432 and the first optical surface 431, and the symbol "α2" indicates an angle formed between the second optical surface 432 and a surface 412 of the display element 410 (that is, the screen). When a condition of α1≠α2 is satisfied, curvature of image field for the reflected light can be reduced.

The second and third optical surfaces 432 and 433 are flat faces which are parallel to each other and have a power (or a refractive power) of zero (0). Under this condition, occurrence of the aberration of the reflected light due to an off-center or tilt of the optical surfaces can be reduced.

The light 461 output from the display element 410 is input to the user's eye by the light guide element 430, and the user sees a virtual image enlarged as compared with the image displayed on the screen 412 of the display element 410. In FIG. 4, the symbol "I" indicates the position of the user's eye. The light guide portion 440 and the compensation portion 450 may have powers which have opposite signs and an equal absolute value. For example, the compensation portion 450 may be bonded or connected to the fourth optical surface 434 of the light guide portion 440. When the light guide portion 440 and the compensation portion 450 have powers that have opposite signs and an equal absolute value, the incident angle of the external light 462 input to the compensation portion 450 and the projecting angle of the external light 462 output from the light guide portion 440 are equal to each other, as in a case of light penetrating or passing through a transparent flat plate, for example. That is, the external light 462 penetrates or passes through the light guide element 430 without being distorted to be seen by the user.

Due to the fourth optical surface 434 having a partial transmission/partial reflection characteristic, the user is capable of seeing surrounding scenes and a virtual image at once.

The fourth optical surface 434 may be defined by Equation 1 as follows:

$$z = \frac{CUXx^2 + CUYy^2}{1 + \sqrt{1 - (1+KX)CUX^2x^2 - (1+KY)CUY^2y^2}} + \quad \text{Equation 1}$$

$$AR\{(1-AP)x^2 + (1+AP)y^2\}^2 +$$

-continued
$$BR\{(1-BP)x^2 + (1+BP)y^2\}^3 +$$
$$CR\{(1-CP)x^2 + (1+CP)y^2\}^4 +$$
$$DR\{(1-DP)x^2 + (1+DP)y^2\}^5$$

In Equation 1, z represents a sag value (that is, a z axis coordinate (mm unit)) of the fourth optical surface 434, which is substantially perpendicular to a z-axis, on a {x, y} coordinate, CUX represents an x-axis curvature of (a reciprocal of an x-axis curvature radius RX (mm unit), i.e., 1/RX) of the fourth optical surface 434, CUY represents a y-axis curvature of (a reciprocal of an y-axis curvature radius RY (mm unit), i.e., 1/RY) of the fourth optical surface 434, KX represents an x-axis conic constant, KY represents a y-axis conic constant, AR, BR, CR, and DR represent fourth order, sixth order, eighth order, and tenth order coefficients about rotational symmetry, and AP, BP, CP, and DP represent fourth order, sixth order, eighth order, and tenth order coefficients about rotational asymmetry.

For example, the fourth optical surface 434 may have RX of 76.244, RY of 85.870, KY of −10.64144, AR of −2.19904E−10, BR of 6.45377E−15, CR of 1.20241E−10, DR of 2.85792E−11, KX of −0.64786, AP of −60.41586, BP of 95.02635, CP of −0.64648, and DP of −1.26622.

The symbol "d1" represents a distance between the apex of the fourth optical surface 434 and the visual axis 460. In the present exemplary embodiment, d1 may be 5.5 mm. That is, the fourth optical surface 434 may be off-center by 5.5 mm from the visual axis 460. The apex of the fourth optical surface 434 is not coincident with, but is off-center from, the center of the fourth optical surface 434 (i.e., a middle position of the width of the fourth optical surface 434 along a direction parallel to the second or third optical surface 432 or 433). The apex of the fourth optical surface 434 may refer to the highest or lowest point of the fourth optical surface 434 as viewed from the z-axis, and the point that becomes the origin of a coordinate axis in the definition of the fourth optical surface 434 according to, for example, Equation 1. The symbol "d2" indicates the distance between the apex of the fourth optical surface 434 and the third optical surface 433, in which the distance may be 0.823 mm. The symbol "α3" indicates an angle formed by a tangential line at the apex of the fourth optical surface 434 (that is, the y-axis) and the third optical surface 433, in which the angle may be 28.36 degrees in the present exemplary embodiment. The symbol "α1" indicates an angle formed by the second optical surface 432 and the first optical surface 431, in which the angle may be 59.72, and the symbol "α2" indicates an angle formed by the second optical surface 432 and the surface 412 of the display element 410 (that is, the screen), in which the angle may be 28.39. The thickness t1 of the body 441 may be 5.5 mm, and the thickness t2 of the first portion 442 may be 7.876 mm. A chief ray C refers to the light that passes the visual axis 460 among the light output from the display element 410. The symbol "L" indicates a distance between the center of the first optical surface 431 of the light guide element 430 on the display element 410 side (or a point where the chief ray meets the first optical surface 431) and the center of the fourth optical surface 434 (or a point where the chief ray meets the fourth optical surface 434), in which the distance may be 27.444 mm. The distance between the first optical surface 431 and the cover glass 420 along the chief ray may be 3.06 mm, and the thickness of the cover glass 420 may be 1.425 mm. The light guide element 430 may be formed as ZE-E48R (Zeonex Grade E48R), and the cover glass 420 may be formed as BSC7 (glass code 517.642). As described above, L is set such that the chief ray directed or transmitted to the inside of the light guide element 430 is totally reflected 2n times (where n is a natural number) (in the present exemplary embodiment, four times) from the second and third optical surfaces 432 and 433.

Figures 5A, 5B:
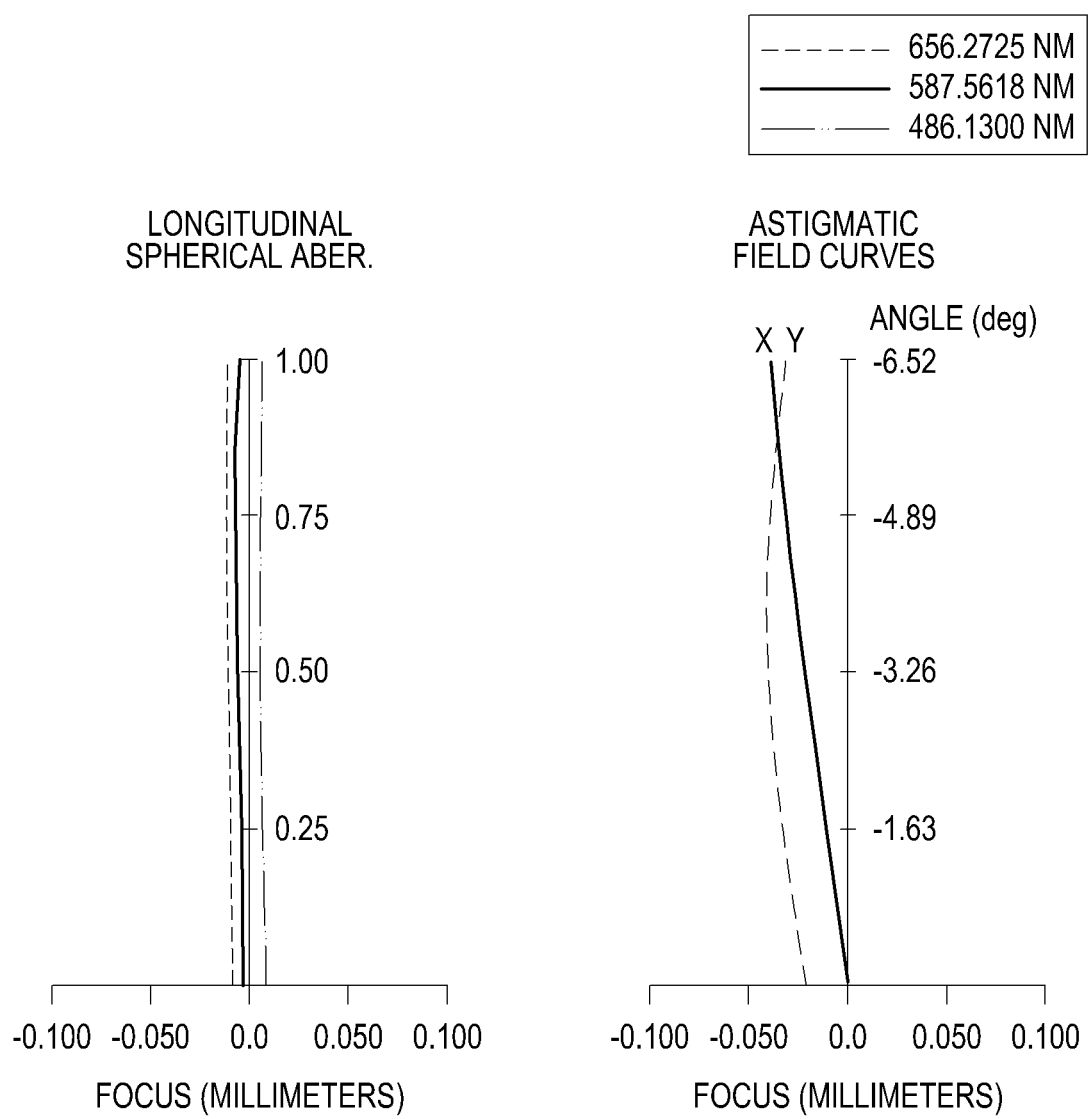
FIGS. 5A and 5B illustrate aberration characteristics of a light guide element according to an exemplary embodiment.

FIGS. 5A and 5B illustrate aberration characteristics of a light guide element 430 according to an exemplary embodiment.

FIG. 5A illustrates a longitudinal spherical aberration of the light guide element 430, in which the longitudinal spherical aberration is changed depending on a change of wavelength.

In FIG. 5A, the horizontal axis represents a longitudinal spherical aberration coefficient, and the vertical axis represents a normalized distance from the center of an optical axis to an edge of an image.

As illustrated in FIG. 5A, it can be seen that there is little change in longitudinal spherical aberration according to change of a wavelength so that occurrence of the longitudinal spherical aberration for the light guide element 430 is low.

FIG. 5B illustrates an astigmatic aberration and curvature of image field for the light guide element 430, which are results obtained at a wavelength of 587.56 nm. In FIG. 5B, the solid line represents the astigmatic aberration in a tangential direction and the dotted line represents the astigmatic aberration in a sagittal direction.

In FIG. 5B, the difference between the solid line and the dotted line represents an astigmatic aberration and the curvature of the solid line represents curvature of image field.

FIG. 5B illustrates a change amount of the astigmatic aberration and a change amount of the curvature of image field, in which the horizontal axis represents a coefficient of the astigmatic aberration or the curvature of image field, and the vertical axis represents the distance from the center of a virtual image to the edge of the virtual image.

From FIG. 5B, it can be seen that there is little change in astigmatic aberration and curvature of image field from the center of the virtual image to the edge of the virtual image, so that occurrence of the astigmatic aberration and the curvature of image field for the light guide element 430 is low.

Figure 6:
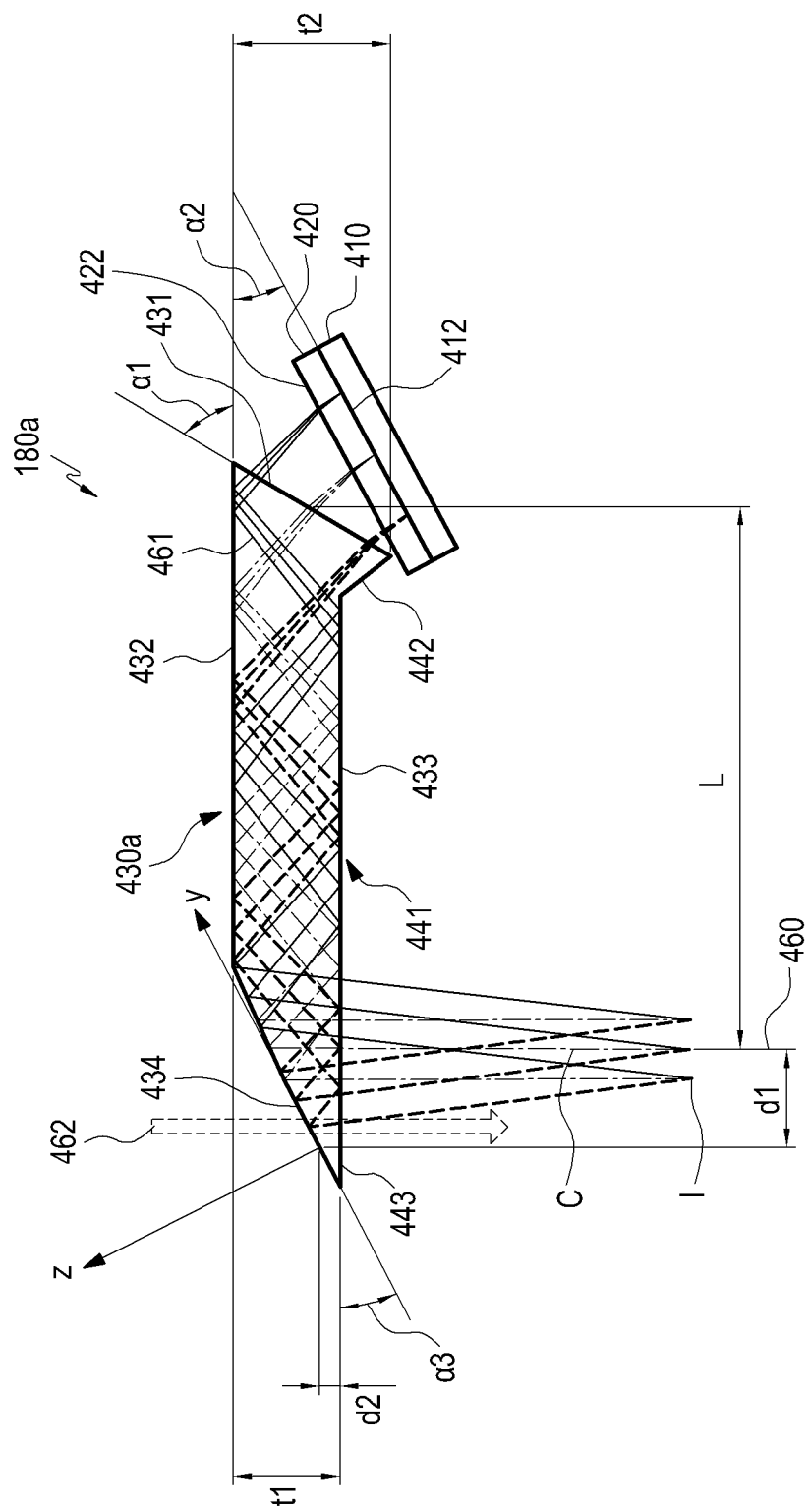
FIG. 6 illustrates a configuration of a first projector according to another exemplary embodiment.

FIG. 6 illustrates a configuration of a first projector 180a according to another exemplary embodiment. The first projector 180a illustrated in FIG. 6 has a configuration that is substantially the same as or similar to that of the first projector 180 illustrated in FIG. 4, except that the compensation portion of the light guide element 430a is not included in the first projector 180a. Accordingly, the same components will be denoted with the same reference numerals and redundant descriptions will be omitted below.

The light guide element 430a has a prismatic shape, and includes first to fourth optical surfaces 431, 432, 433, and 434. The light guide element 430a includes: a body 441 disposed between the second and third optical surfaces 432 and 433 and having a thickness (or a thickness in the widthwise direction of the light guide element 430a) that is constant along the visual axis 460 (or the optical axis) of the user's eye looking towards the front side; a first portion 442 disposed between the first and second optical surfaces 431 and 432 and having a thickness that gradually increases towards the display element 410; and a second portion 443 disposed between the third and fourth optical surfaces 433 and 434 and having a thickness that gradually decreases in a direction away from the display element 410.

Figure 7:
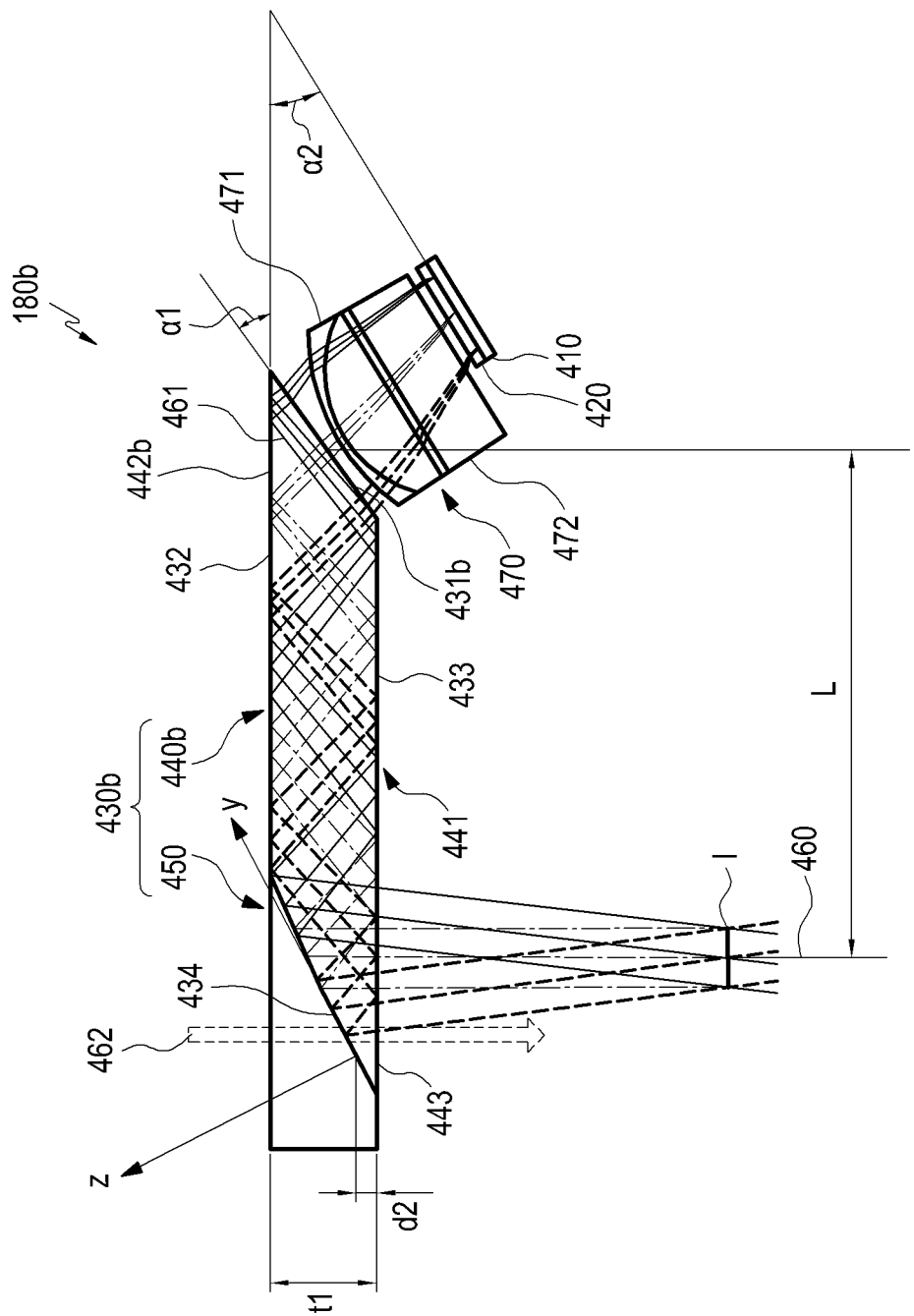
FIG. 7 illustrates a configuration of a first projector according to still another exemplary embodiment.

FIG. 7 illustrates a configuration of a first projector 180b according to still another exemplary embodiment. The first projector 180b illustrated in FIG. 7 has a configuration that is substantially the same as or similar to that of the first projector 180 illustrated in FIG. 4, except that the light guide portion 440b of the light guide element 430b has opposite side portions that have the same shape, and a lens system 470 is further arranged between the first optical surface 434 and the cover glass 420. Accordingly, the same components will be denoted with the same reference numerals and redundant descriptions will be omitted below.

The light guide element 430b has a prismatic shape, and includes first to fourth optical surfaces 431b, 432, 433, and 434. The light guide element 430b includes a light guide portion 440b and a compensation portion 450 that are separated from each by the fourth optical surface 434, which is a reflective surface. The light guide portion 440b includes: a body 441 disposed between the second and third optical surfaces 432 and 433 and having a thickness (or a thickness in the widthwise direction of the light guide element 430a) that is constant along the visual axis 460 (or the optical axis) of the user's eye looking towards the front side; a first portion 442b disposed between the first and second optical surfaces 431b and 432 and having a thickness that gradually decreases towards the display element 410; and a second portion 443 disposed between the third and fourth optical surfaces 433 and 434 and having a thickness that gradually decreases in a direction away from the display element 410.

A lens system 470 is arranged between the cover glass 420 and the first optical surface 431b, and has a function of diffusing light 461, which has been output from the display element 410 and has passed through the cover glass 420, and inputting the diffused light to the first optical surface 431b. The lens system 470 may include a plurality of lens surfaces, each of which refracts the light 461 input thereto. The plurality of lens surfaces may be provided by at least one first lens 471. For example, the first lens 471 may include a cemented doublet lens in which a concave lens and a convex lens are cemented to each other. For example, the lens system 470 may further include a Polarization Beam Splitter (PBS) 472 that passes therethrough a polarized component of a first direction in the input light that is perpendicular to the traveling direction of the light, and reflects a polarized component of a second direction that is perpendicular to both the traveling direction of the light and the first direction. For example, the PBS may cause the polarized component of the first direction to be incident on the first optical surface 431b through the first lens 471.

The symbol "t1" indicates the thickness of the body 441 of the light guide element. In order to reduce the thickness t1 of the body 441, the fourth optical surface 434 is positioned to be inclined to the visual axis 460 of the user's eye. In order to reduce the astigmatic aberration of the reflected light that is caused due to the inclination, the fourth optical surface 434 is formed in a rotationally asymmetric and aspherical surface.

The symbol "d2" indicates a distance from the apex of the fourth optical surface 434 to the third optical surface 433 along the visual axis 460 of the user's eye. The apex of the fourth optical surface 434 is positioned inside the light guide element 430, and when a condition of d2<t1/2 is satisfied, the aberration of the light 461 reflected by the fourth optical surface 434 may be reduced and the thickness t1 of the body 441 may be reduced. When d2≥t1/2, the thickness t1 of the body 441 increases in order to reduce the aberration of the reflected light 461 so as not to exceed a pre-set threshold. When the apex of the fourth optical surface 434 does not exist within the light guide element 430b (e.g., d2≤0, that is, when the apex is positioned below the third optical surface 433), it may be difficult to correctly measure the fourth optical surface 434, for example, when the light guide element 430b is manufactured through injection molding, and thus, it may difficult to correct a mold to compensate a manufacturing tolerance. Accordingly, it may be difficult to reduce the aberration of the reflected light 461.

The symbol "L" indicates a distance between the center of the first optical surface 431b and the center of the fourth optical surface 434 (or a point where the visual axis 460 or a chief ray intersects with the fourth optical surface 434). The distance L is set such that the light directed or transmitted to the inside of the light guide element 430b is totally reflected 2n times (where n is a natural number) from the second and third optical surfaces 432 and 433. The total reflection of the 2n times allows the display element 410 to be positioned closer to the user's eye with reference to the position of the second optical surface 432 according to the visual axis of the user's eye so that a space protracting from the display device 100 outwardly in a direction away from the user's eye can be reduced. As a result, a visual volume (i.e., the volume of the display observed or perceived by other persons) can be reduced.

The symbol "α1" indicates an angle formed by the second optical surface 432 and a first optical surface 431b, and the symbol "α2" indicates an angle formed by the second optical surface 432 and the surface of the display element 410 (that is, the screen). When a condition of α1≠α2 is met, the curvature of image field for the reflected light 461 can be reduced.

The second and third optical surfaces 432 and 433 are flat faces which are parallel to each other and have a power (or a refractive power) of zero (0). Under this condition, occurrence of the aberration of the reflected light due to an off-center or tilt of the optical surfaces can be reduced.

The light 461 output from the display element 410 is input to the user's eye by the light guide element 430b, and the user sees a virtual image enlarged as compared to the image displayed on the screen of the display element 410. In FIG. 7, the symbol "I" indicates the position of the user's eye. The light guide light guide portion 440b and the compensation portion 450 may have powers that have opposite signs and an equal absolute value. For example, the compensation portion 450 may be bonded or connected to the light guide portion 440b. When the light guide portion 440b and the compensation portion 450 have powers that have opposite signs and an equal absolute value, the incident angle of the external light 462 input to the compensation portion 450 and the projecting angle of the external light 462 output from the light guide portion 440b are equal to each other, as in a case of light penetrating or passing through a transparent flat plate, for example. That is, the external light 462 penetrates or passes through the light guide element 430b without being distorted to be seen to the user.

Due to the fourth optical surface 434 having a partial transmission/partial reflection characteristic, the user is capable of seeing surrounding scenes and a virtual image at once.

Figures 8A, 8B:
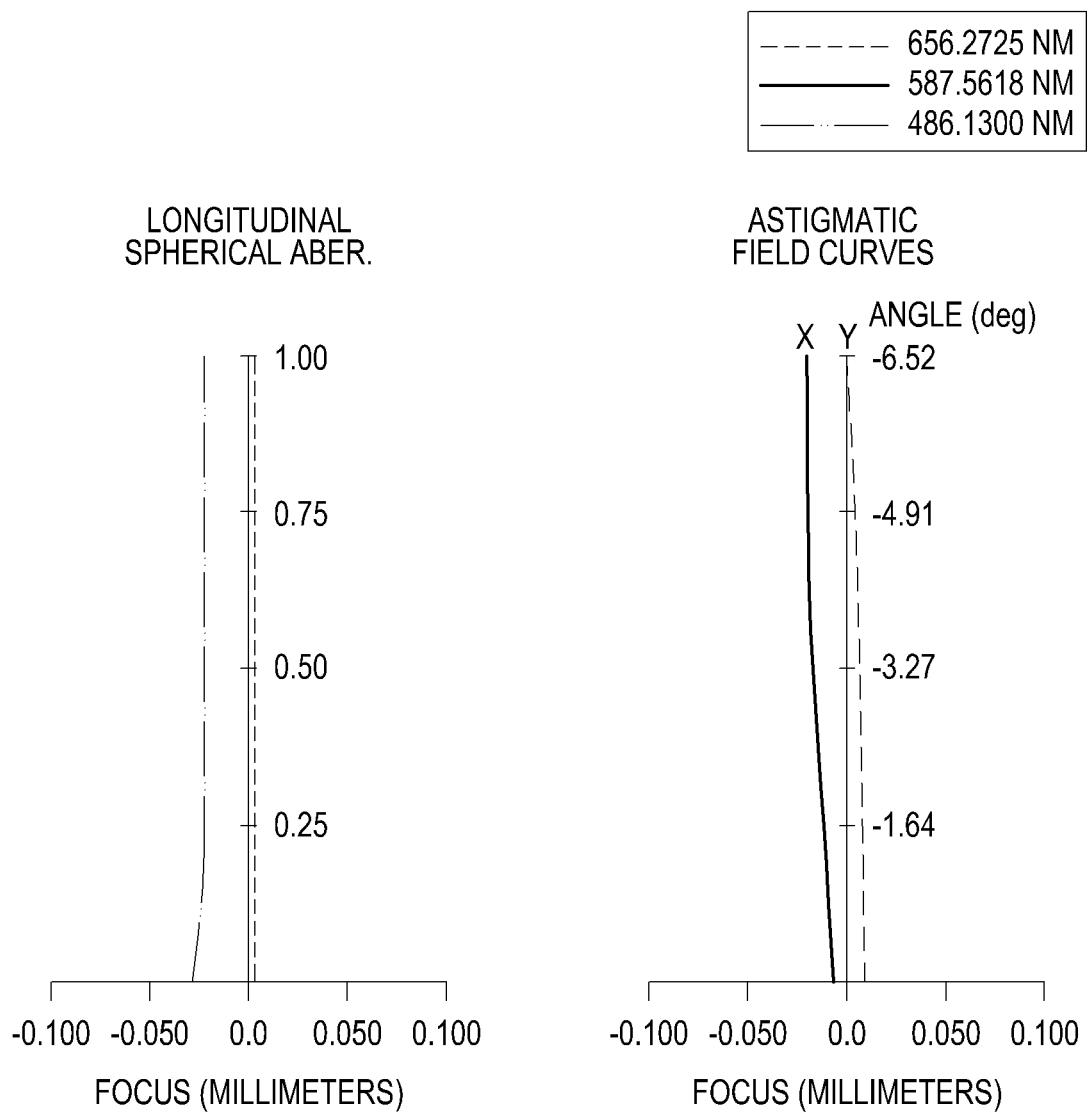
FIGS. 8A and 8B illustrate aberration characteristics of a light guide element according to still another exemplary embodiment.

FIGS. 8A and 8B illustrate aberration characteristics of a light guide element 430b according to still another exemplary embodiment.

FIG. 8A illustrates a longitudinal spherical aberration of the light guide element 430b, in which the longitudinal spherical aberration is changed depending on a change of wavelength.

In FIG. 8A, the horizontal axis represents a longitudinal spherical aberration coefficient, and the vertical axis represents a normalized distance from the center of an optical axis to an edge of an image.

As illustrated in FIG. 8A, it can be seen that there is little change in longitudinal spherical aberration according to change of a wavelength so that occurrence of the longitudinal spherical aberration for the light guide element 430b is low.

FIG. 8B illustrates an astigmatic aberration and curvature of image field for the light guide element 430b, which are results obtained at a wavelength of 587.5618 nm, in which the solid line represents the astigmatic aberration in a tangential direction and the dotted line represents the astigmatic aberration in a sagittal direction.

In FIG. 8B, the difference between the solid line and the dotted line represents an astigmatic aberration and the curvature of the solid line represents curvature of image field.

FIG. 8B illustrates a change amount of the astigmatic aberration and a change amount of the curvature of image field, in which the horizontal axis represents a coefficient of the astigmatic aberration or the curvature of image field, and the vertical axis represents the distance between from the center of a virtual image to the edge of the virtual image.

From FIG. 8B, it can be seen that there is little change in astigmatic aberration and curvature of image field from the center of the virtual image to the edge of the virtual image, so that occurrence of the astigmatic aberration and the curvature of image field for the light guide element 430b is low.

Figure 9:
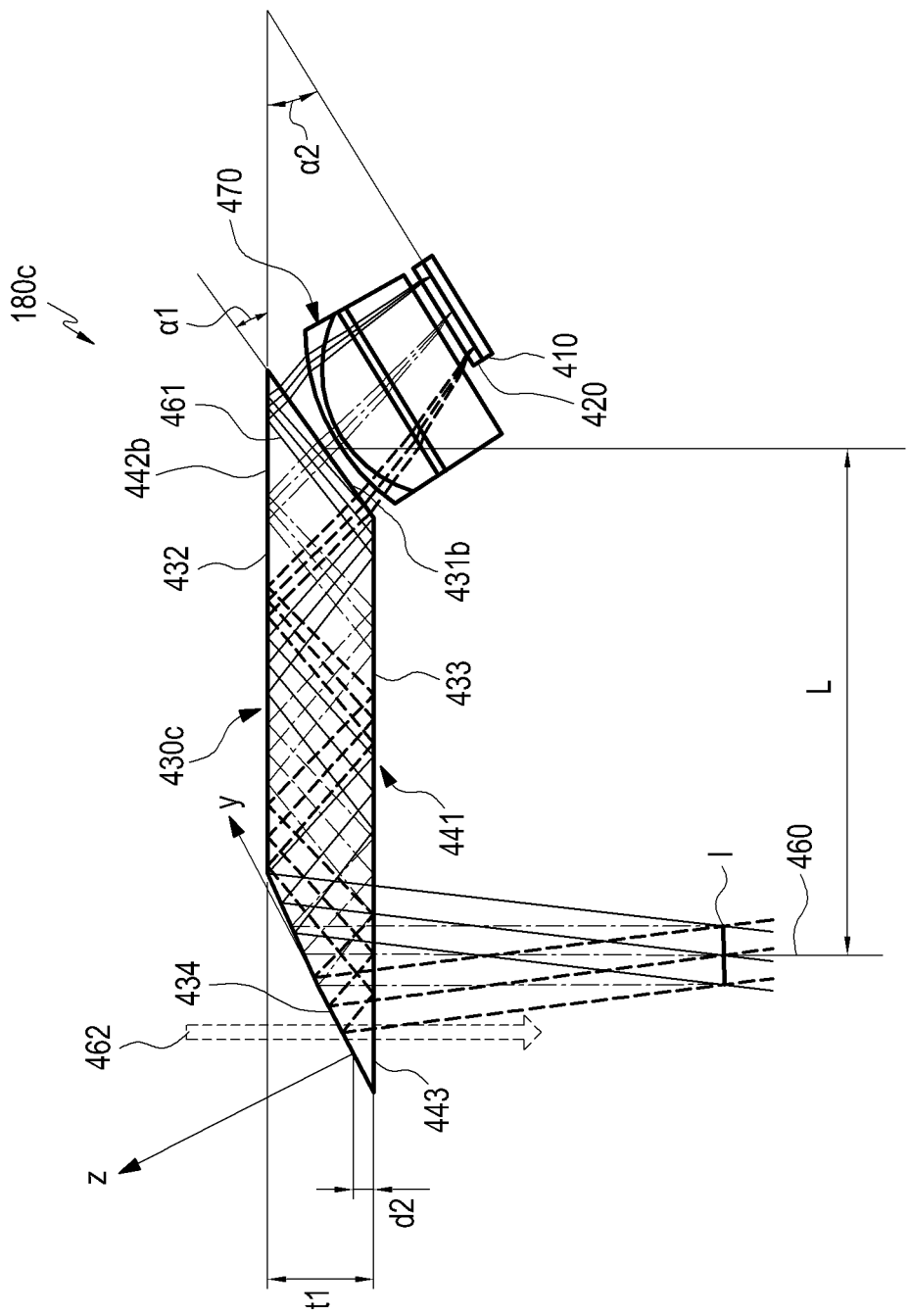
FIG. 9 illustrates a configuration of a first projector according to still another exemplary embodiment.

FIG. 9 illustrates a configuration of a first projector 180c according to still another exemplary embodiment. The first projector 180c has a configuration which is substantially the same as or similar to that of the first projector 180b illustrated in FIG. 7, except that the compensation portion of the light guide element 430c is not included in the first projector 180c. Accordingly, the same components will be denoted with the same reference numerals and redundant descriptions will be omitted below.

The light guide element 430c has a prismatic shape, and includes first to fourth optical surfaces 431b, 432, 433, and 434. The light guide element 430c includes: a body 441 disposed between the second and third optical surfaces 432 and 433 and having a thickness that is constant along the visual axis 460 (or the optical axis) of the user's eye looking towards the front side; a first portion 442b disposed between the first and second optical surfaces 431b and 432 and having a thickness that gradually increases towards the display element 410; and a second portion 443 disposed between the third and fourth optical surfaces 433 and 434 and having a thickness that gradually decreases in a direction away from the display element 410.

Figure 10:
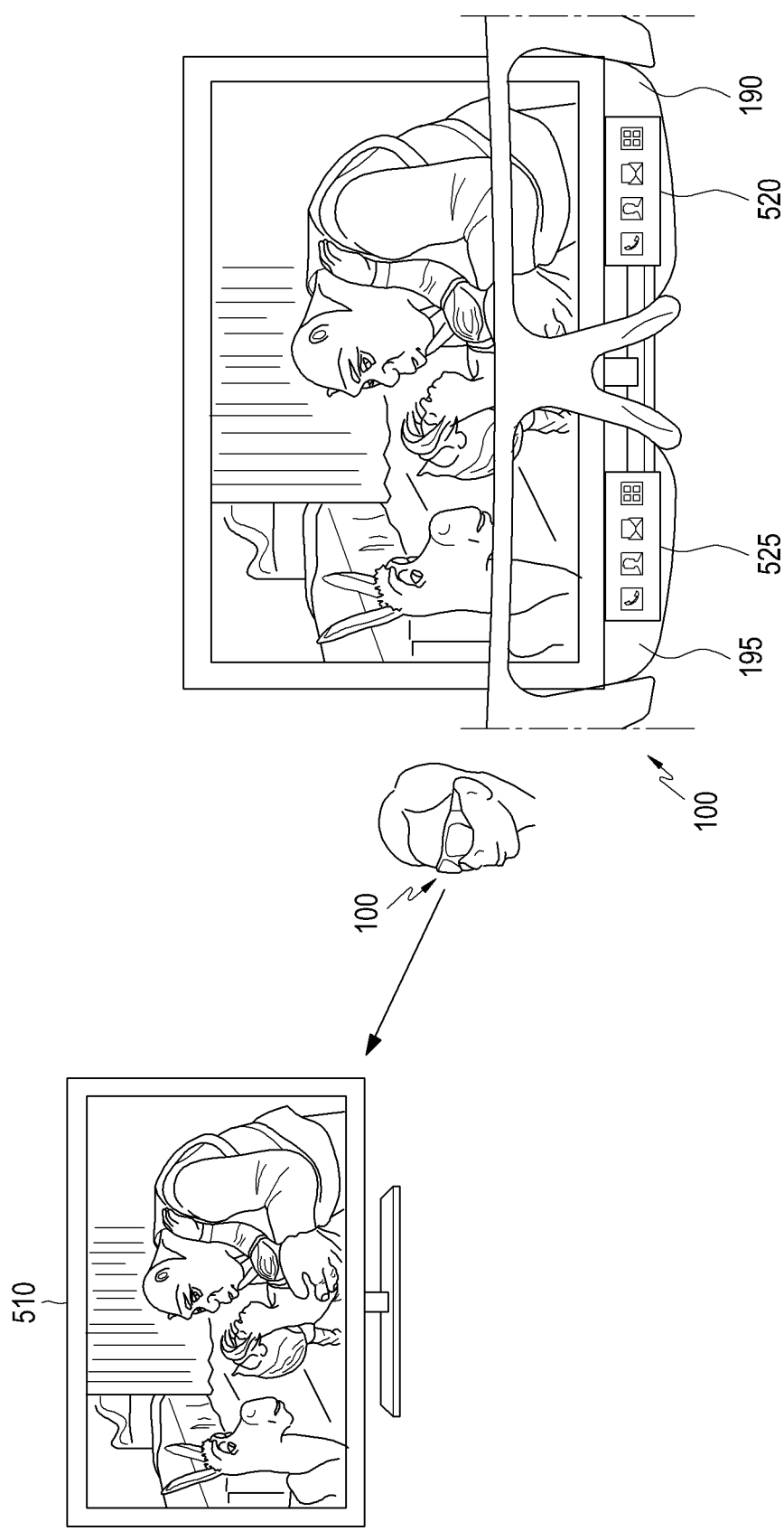
FIGS. 10 and 11 are views for describing transmissivity control of a display device.
Figure 11:
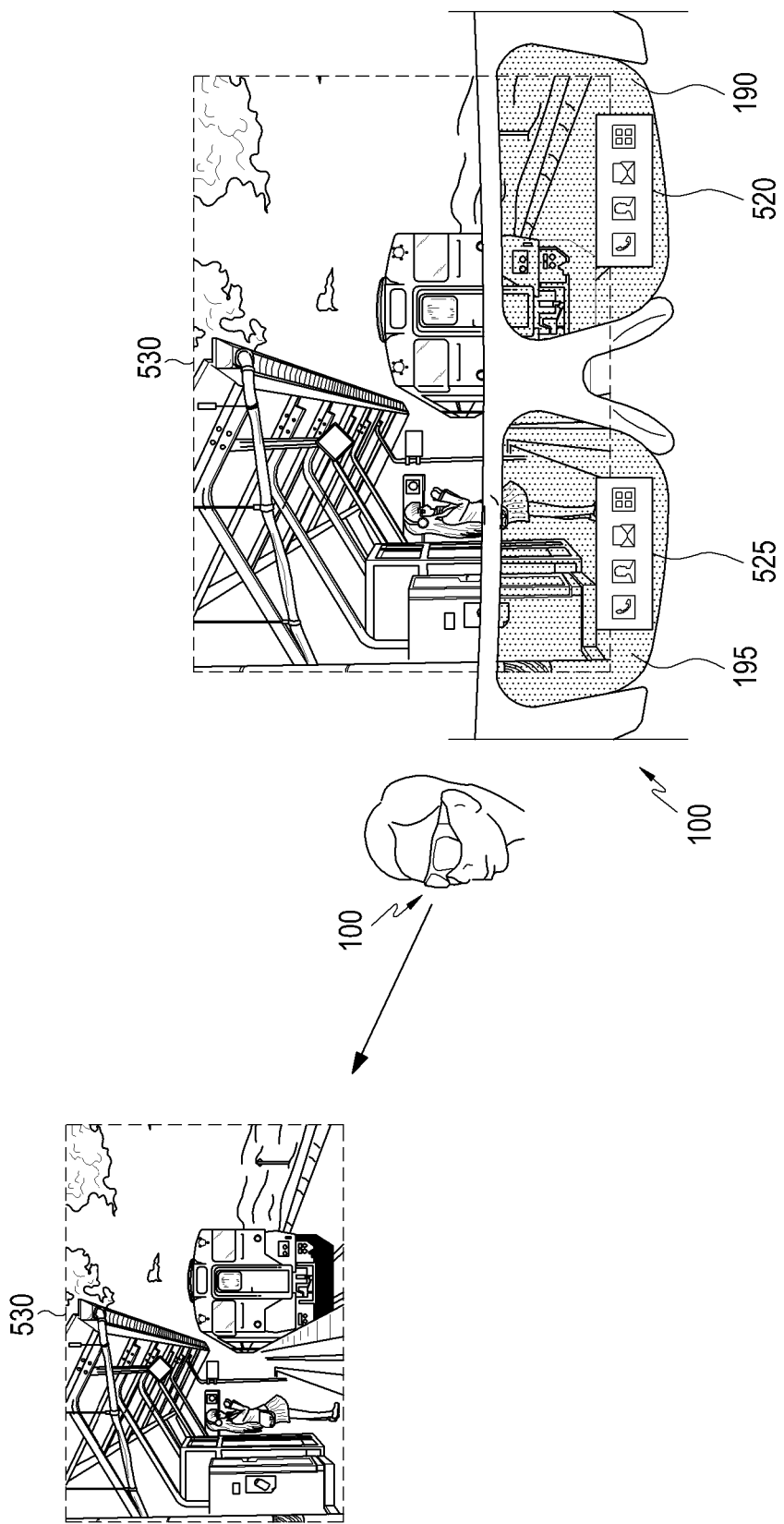

FIGS. 10 and 11 are views for describing light transmissivity control of a display device 100. The transmissivities of the first and second windows 190 and 195 are adjustable according to the control of the control unit 200 so that visibility of a virtual image, such as a GUI, can be enhanced. According to various exemplary embodiments, the transmissivities or one or both of the first and second windows 190 and 195 are adjustable, and may be adjustable together or separately (i.e., independently of each other). Furthermore, the transmissivities may be adjustable according to a user input, according to pre-set settings (e.g., based on a time of day, a season, or obtained environment information), based on sensed or measured parameters (e.g., a luminous intensity of a surrounding environment), etc.

Since the light transmissivities of each of the first and second windows 190 and 195 is capable of being adjusted according to a change of an applied voltage, the output of the first projector 180 and/or the second projector 185 can be reduced. As a result, the entire power consumption and heat generation of the first projector 180 and/or the second projector 185 can be reduced, and the use time of the battery 150 of the display device 100 can be increased.

FIG. 10 illustrates a case where the user watches a TV indoors.

Referring to FIG. 10, the user watches a TV 510 indoors in a state where the user wears the display device 100. Furthermore, in a room with a low surrounding luminous intensity, since the visibility of first and second virtual images 520 and 525 formed by the first and second projectors 180 and 185 is high, the transmissivities of the first and second windows 190 and 195 are set to be relatively high. For example, the control unit 200 may set the transmissivities of the first and second windows 190 and 195 to the maximum or to 30% or more. In the present exemplary embodiment, the first and second virtual images 520 and 525 are equal to each other, except for the display positions thereof.

FIG. 11 illustrates a case where the user sees surrounding scenes in an open air environment.

Referring to FIG. 11, the user watches surrounding scenes 530 in the open air environment in a state where the user wears the display device 100. Furthermore, in the open air environment with a high surrounding luminous intensity, since the visibility of first and second virtual images 520 and 525 formed by the first and second projectors 180 and 185 is low, the transmissivities of the first and second windows 190 and 195 is set to be relatively low. For example, the control unit 200 may set the transmissivities of the first and second windows 190 and 195 to the minimum or to 10% or less.

In FIGS. 10 and 11, the first virtual image 520 and the second virtual image 525 are not images formed on the first and second windows 190 and 195, but are images shown to the user. In FIGS. 10 and 11, each of the virtual images is displayed to be opaque. However, the virtual images may be displayed to be partially or entirely transparent so that the surrounding scenes positioned under the virtual images can be seen therethrough.

The control unit 200 measures the surrounding luminous intensity through the sensor unit 130. When the surrounding luminous intensity is lower than a first pre-set reference luminous intensity or the surrounding luminous intensity is in a first luminous intensity range, the control unit 200 increases the transmissivities of the first and second windows 190 and 195 (i.e., the transmissivity is set to be relatively high), and when the surrounding luminous intensity is greater than a second pre-set reference luminous intensity or the surrounding luminous intensity is in a second luminous intensity range, the control unit 200 decreases the transmissivities of the first and second windows 190 and 195 (i.e., the transmissivities are set to be relatively low). When the surrounding luminous intensity is in a third luminous intensity range, the control unit 200 may maintain the transmissivities of the first and second windows 190 and 195 as is. The reference luminous intensity may be the currently set surrounding luminous intensity, and when there is no change in the surrounding luminous intensity, the control unit 200 may maintain the transmissivities of the first and second windows 190 and 195 as is. The control unit 200 may store the currently set surrounding luminous intensity and/or the transmissivities in the storage unit 120.

The storage unit 120 may store a data table that represents surrounding luminous intensity values and transmissivities (and/or an applied voltage value of each of the windows 190 and 195) that correspond to each other, and the control unit 200 calculates a target transmissivity (and/or the applied voltage value of each of the windows 190 and 195) corresponding to the surrounding luminous intensity value through, for example, mapping, interpolation, or calculation of a mathematical formula based on the data table. The control unit 200 applies a voltage corresponding to the calculated transmissivity to each of the windows 190 and 195, and more specifically, to each of the glasses to adjust the transmissivity of each of the windows 190 and 195 to the target transmissivity. According to various exemplary embodiments, the control unit 200 may perform the above processes for both of the windows 190 and 195 together, or for each of the windows 190 and 195 separately. In the latter case, one or more sensor units 130 may be used to measure the surrounding luminous intensities.

Figure 12:
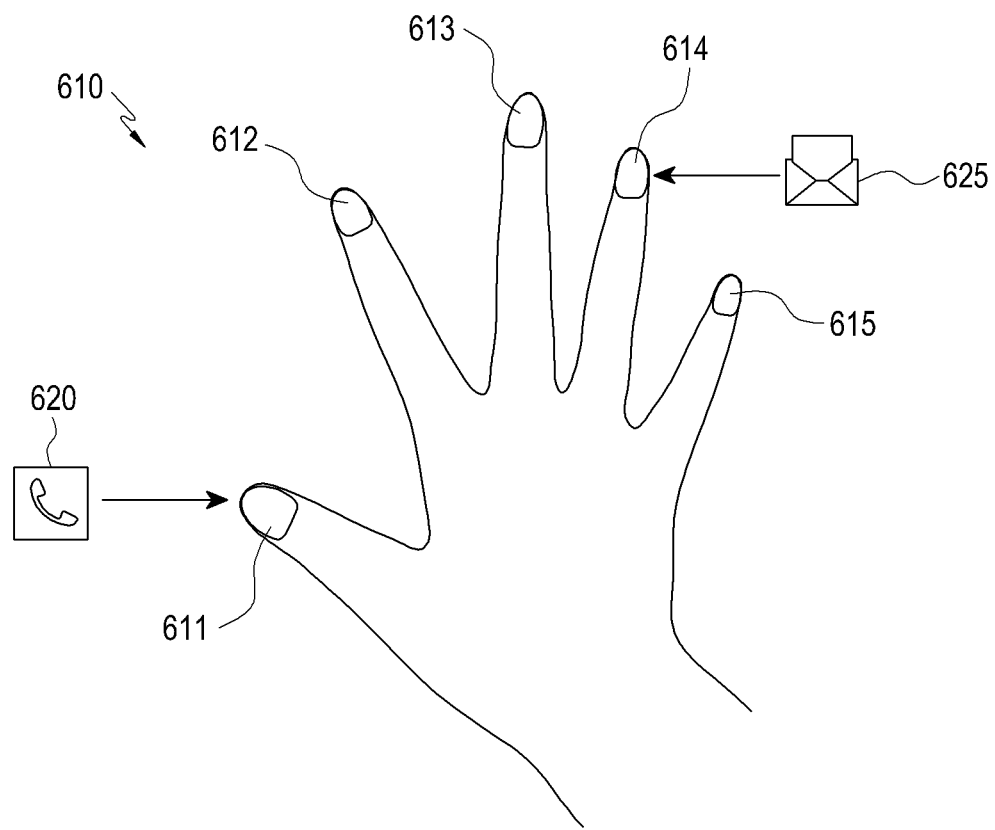
FIGS. 12 and 13A and 13B are views for describing a fingerprint-based shortcut key execution according to an exemplary embodiment.
Figure 13A:
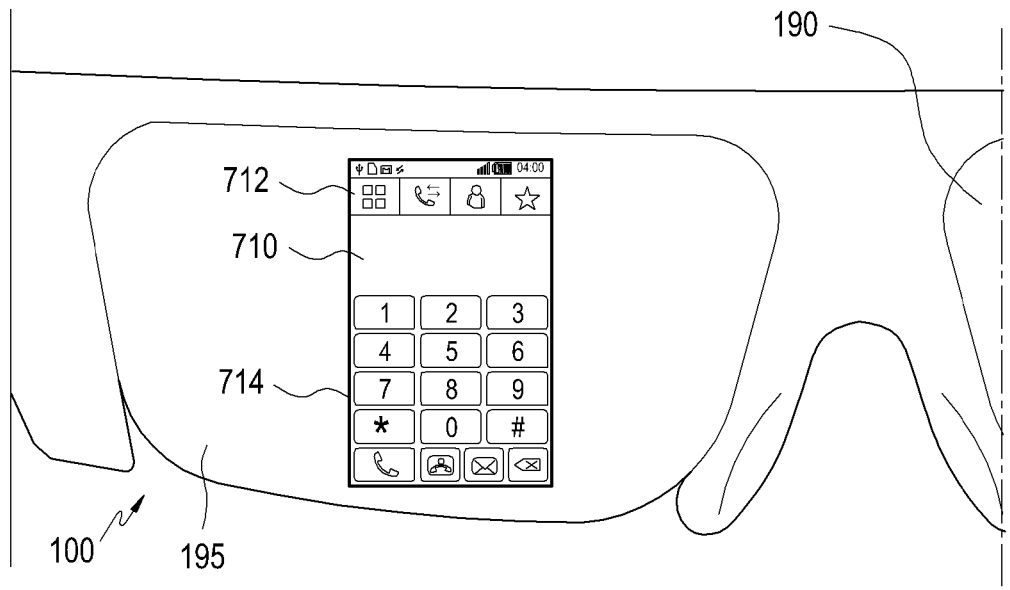
Figure 13B:
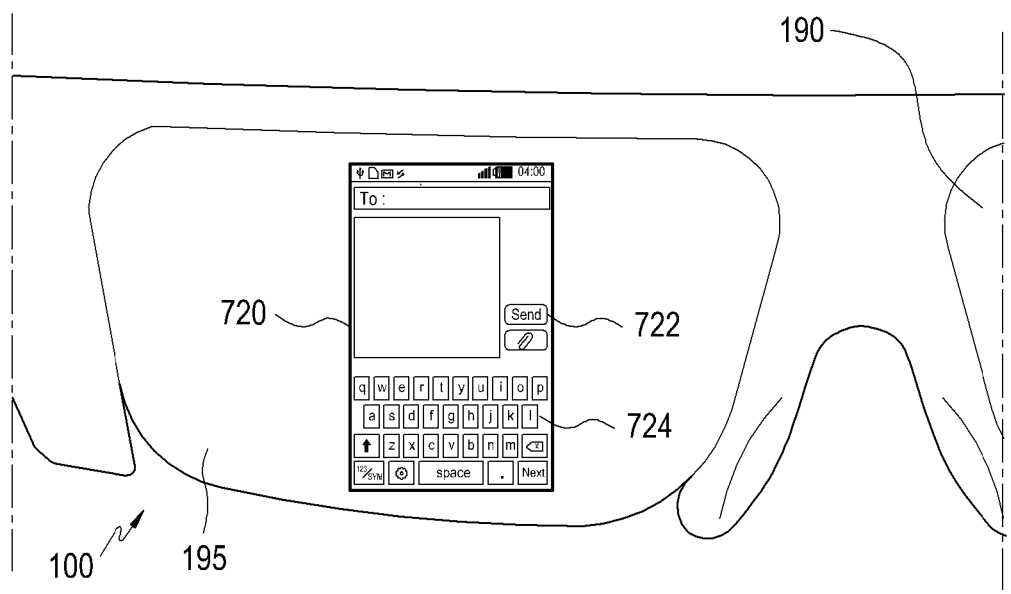

FIGS. 12 and 13A and 13B are views for describing a fingerprint-based shortcut key execution according to an exemplary embodiment.

Referring to FIG. 12, the touch sensor 160 may have a fingerprint sensing function. For example, the user may map at least one of the thumb fingerprint 611, the forefinger fingerprint 612, the middle finger fingerprint 613, the ring finger fingerprint 614, and the little finger (i.e., pinky finger) fingerprint 615 of the user's right hand 610 with a function of the display device 100 or a user account.

In the present example, the user maps a phone application 620 on the thumb fingerprint 611, and a message application 625 on the ring finger fingerprint 614.

Referring to FIG. 13A, when the user inputs the thumb fingerprint to the touch sensor 160, the control unit 200 executes the phone application in response to the user input. The control unit 200 configures a call application window 710 using the data stored in the storage unit 120, and displays the configured call application window 710 to the user through the projectors 180 and 185.

The phone application displays a keypad 714 for inputting a phone number and menu items 712, such as keypad conversion, recent record, contact information, and bookmark, on the call application window 710.

Referring to FIG. 13B, when the user inputs the ring finger fingerprint to the touch sensor 160, the control unit 200 executes a message application in response to the user input. The control unit 200 configures a message application window 720 using the data stored in the storage unit 120, and displays the configured message application window 720 to the user through the projectors 180 and 185.

The message application displays a keypad 724 for inputting text, and menu items 722, such as message transmission and file attachment, on the message application window 720.

Figure 14:
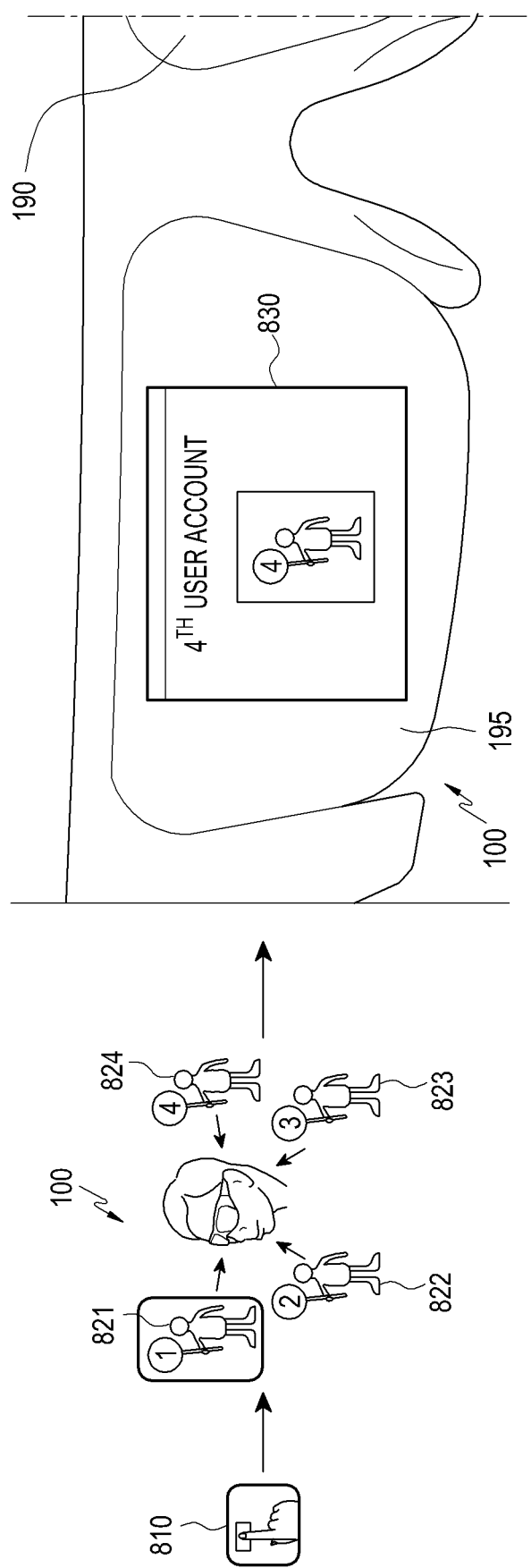
FIG. 14 is a view for describing a user account change function according to a fingerprint input, according to an exemplary embodiment.

FIG. 14 is a view for describing a user account change function according to a fingerprint input, according to an exemplary embodiment.

In the present example, first to fourth user accounts 821, 822, 823, and 824 mapped to first to fourth fingerprints, respectively, are stored in the storage unit 120.

When the user inputs a fingerprint to the touch sensor 160 (see the step indicated by reference numeral 810), the control unit 200 retrieves fingerprint information matched to the fingerprint information received from the touch sensor 160 from the storage unit 120 so that the user account mapped to the retrieved fingerprint information can be determined. Alternatively, the storage unit 120 may store the first to fourth user accounts 821, 822, 823, and 824 (e.g., a user account, an e-mail account, and an ID) mapped to the user's first to fourth fingerprints. In the present example, an item corresponding to the first user account 821, which is currently used, is displayed with an emphasis mark, the fourth user account 824 is selected according to the user's fingerprint input, and the control unit 200 displays a virtual image 830 according to the fourth user account 824 to the user through the projectors 180 and 185.

Figure 15:
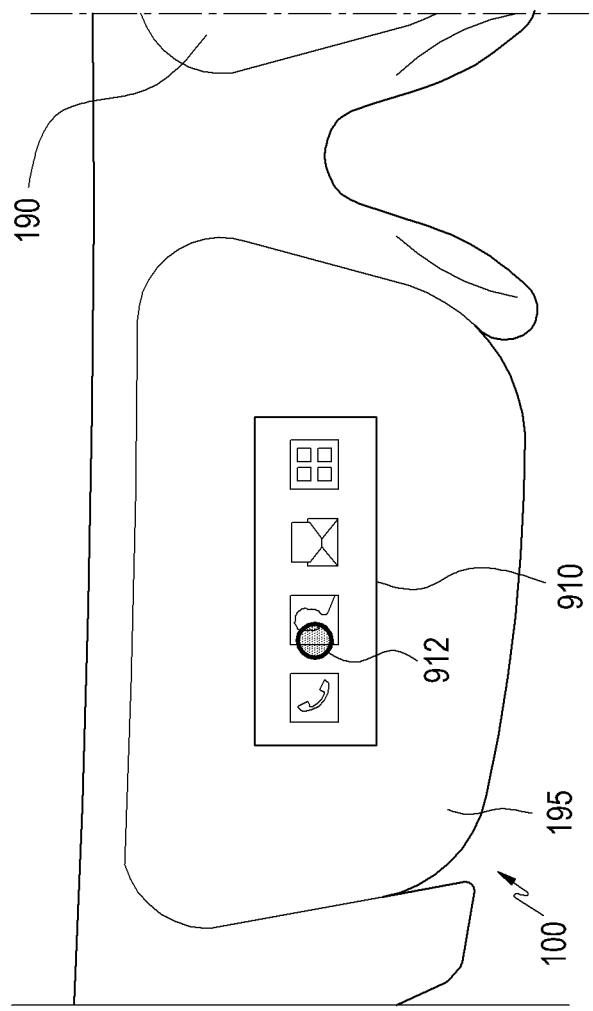
FIG. 15 is a view for describing a screen control method of a display device using a peripheral electronic device, according to an exemplary embodiment.
Figure 15:
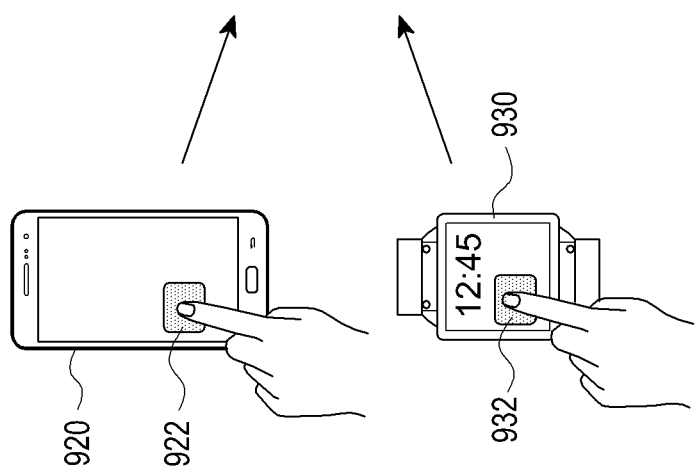

FIG. 15 is a view for describing a screen control method of a display device 100 using a peripheral electronic device, according to an exemplary embodiment.

The control unit 200 may perform short range communication with a peripheral electronic device around the display device 100 through the communication unit 140 so as to provide a screen control service of the display device 100 using the peripheral electronic device. In the present example, the display device 100 may communicate with a wearable electronic device such as a smart watch 930 or a portable phone 920 including a short range communication module. The short range communication may be, for example, Near Field Communication (NFC), Radio Frequency IDentification (RFID), Bluetooth, Bluetooth Low Energy (BLE), ZigBee, infrared (IR) communication, Wi-Fi direct, home Radio Frequency (RF), or Digital Living Network Alliance (DLNA). In the short range communication, the control unit 200 may receive the user's touch 922 or 932 information from the electronic device through the communication unit 140, and change a virtual image displayed on the display device 100 to another virtual image according to the touch information. For example, the control unit 200 may transmit the virtual image information displayed on the display device 100 to the smart watch 930 or the portable phone 920 through the communication unit 140, and perform an image change, such as movement of a cursor 921 within the virtual image, item selection, focus (highlighting item selection) movement, or display of other items, based on the touch 922 or 932 information received from the smart watch 930 or the portable phone 920.

In addition, upon receiving the touch information from the portable phone 920, the control unit 200 may transmit virtual image information including other items which are not displayed on the display device due to the limited size of the virtual image (e.g., various applications such as a game application, a music application, and a camera application), and the items currently displayed on the display device 100 (that is, a phone application, a contact information application, a message application, and a main menu application as shown) to the portable phone 920. Furthermore, the control unit 200 perform an immediate screen change of the display device 100 according to the touch information received from the portable phone 920. For example, when the user transmits selection information of the music application to the display device 100 through the portable phone 920, the control unit 200 may change the home screen to the music application screen to display the music application screen.

Figure 16A:
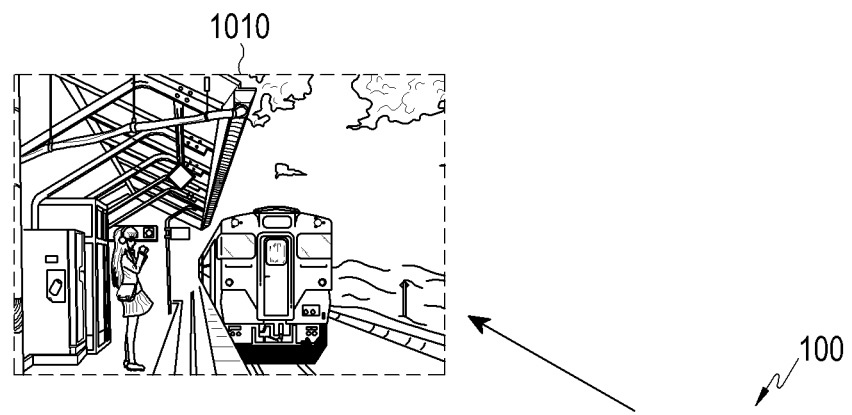
FIGS. 16A and 16B are views for describing a screen control method of a display device using a camera, according to an exemplary embodiment.
Figure 16B:
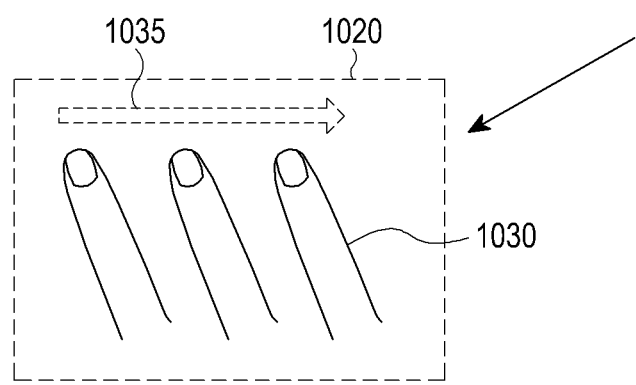

FIGS. 16A and 16B are views for describing a screen control method of a display device 100 using a camera.

The first camera 170 may be used for the purpose of photographing a front subject relative to the position of the user's eye (or the position of the light guide element), and recognizing the front subject. The second camera 175 may be used for the purpose of photographing a lower subject relative to the position of the user's eye, and recognizing the lower subject (e.g., the user's hand).

FIG. 16A illustrates a front image 1010 photographed through the first camera 170, and FIG. 16B illustrates a lower image 1020 photographed through the second camera 175. The control unit 200 may recognize the user's hand or finger 1030 from the lower image 1020 photographed through the second camera 175, and change the virtual image displayed on the display device according to a gesture of the hand or finger 1030. For example, as the user moves the finger 1030 to the right (see arrow 1035), the control unit 200 may perform virtual image change, such as rightward movement of the cursor in the virtual image displayed on the display device 100, selection of a right item, rightward movement of focus (user's selection indication), or display of other items allocated to the rightward direction.

Figure 17:
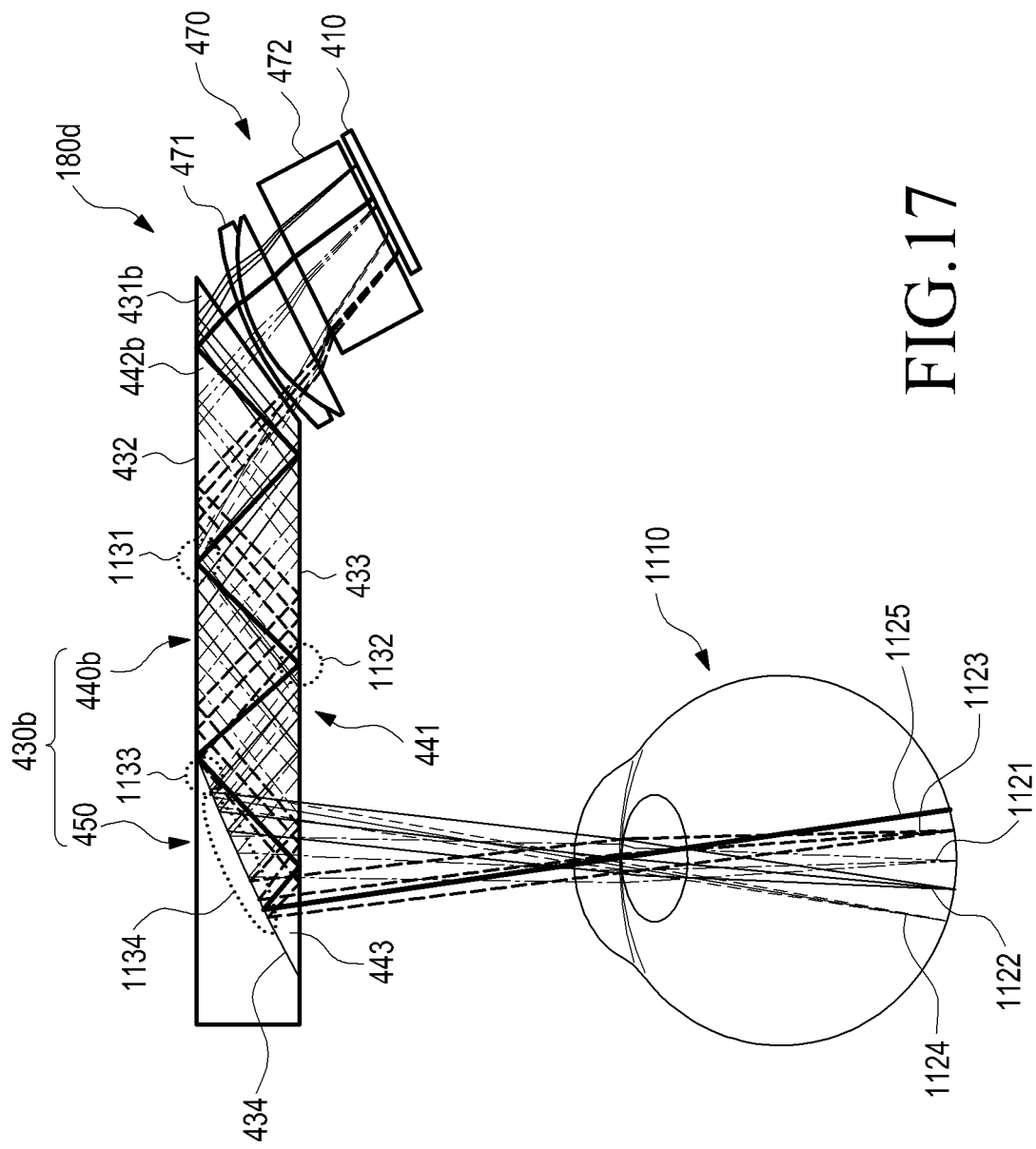
FIG. 17 illustrates a configuration of a first projector according to yet another exemplary embodiment.

FIG. 17 illustrates a configuration of a first projector 180d according to yet another exemplary embodiment. The first projector 180d illustrated in FIG. 17 has a configuration that is substantially the same as or similar to that of the first projector 180b illustrated in FIG. 7, except that the transparent cover glass 420 is not included in the first projector 180d. Accordingly, the same components will be denoted with the same reference numerals and redundant descriptions will be omitted below.

The light guide element 430b has a long prismatic shape, and includes first to fourth optical surfaces 431b, 432, 433, and 434. The light guide element 430b includes a light guide portion 440b and a compensation portion 450 which are separated from each other by the fourth optical surface 434, which is a reflective surface. According to another exemplary embodiment, the compensation portion 450 may be omitted. The light guide portion 440b includes: a body 441 disposed between the second and third optical surfaces 432 and 433 and having a thickness (or a thickness in the widthwise direction of the light guide element 430b) that is constant along the visual axis 460 (or the optical axis) of the user's eye looking towards the front side; a first portion 442b disposed between the first and second optical surfaces 431b and 432 and having a thickness that gradually decreases towards the display element 410; and a second portion 443 disposed between the third and fourth optical surfaces 433 and 434 and having a thickness that gradually decreases in a direction away from the display element 410.

A lens system 470 is arranged between the display element 410 and the first optical surface 431b, and has a function of diffusing lights 1121 to 1125 output from the display element 410, and inputting the diffused lights to the first optical surface 431b. The lens system 470 may include a plurality of lens surfaces, each of which refracts the lights 1121 to 1125 input thereto, in which the plurality of lens surfaces may be provided by at least one first lens 471. For example, the first lens 471 may include a cemented doublet lens in which a concave lens and a convex lens are cemented with each other. For example, the lens system 470 may further include a Polarization Beam Splitter (PBS) 472 that passes therethrough a polarized component of a first direction in the input lights 1121 to 1125 that is perpendicular to the traveling direction of the lights 1121 to 1125, and reflects a polarized component of a second direction that is perpendicular to both the traveling direction of the lights 1121 to 1125 and the first direction. For example, the PBS may cause the polarized component of the first direction to be incident on the first optical surface 431b through the first lens 471.

The lights 1121 to 1125 output from the display element 410 are input to the user's eye 1110 by the light guide element 430b, and the user sees a virtual image enlarged as compared to the image displayed on the screen of the display element 410. Due to the fourth optical surface 434 having the partial transmission (pass)/partial reflection characteristic, the user may see surrounding scenes and the virtual image at once (i.e., simultaneously).

The first to third lights 1121, 1122, and 1123 among the lights 1121 to 1125 output from the display element 410 travel along normal (that is, designed) routes and are input to the user's eye 1110 to form a normal (that is, clear) virtual image, and the fourth and fifth lights 1124 and 1125 among the lights 1121 to 1125 output from the display element 410 travel along abnormal (that is, non-designed) routes and then are input to the user's eye 1110 to form a ghost image that looks blurred as a shape that is the same as or different from at least a part of the normal virtual image (i.e., which is abnormal).

For example, on a portion 1131 of the second optical surface 432 and/or a portion 1132 of the third optical surface 433 where the first to third lights 1121, 1122 and 1123 are not incident (or incident at a small amount that is not more than a pre-set threshold) from the inside of the light guide portion 440b but the fourth light 1124 and/or the fifth light 1125 are incident (e.g., only the fourth light 1124 and/or the fifth light 1125 are incident), a ghost prevention member (or a light shielding member) may be formed or provided so as to extract the fourth light 1124 and/or the fifth light 1125 to the outside of the light guide portion 440b that is not directed towards the user's eye 1110 (e.g., using scattering, reflection, and/or transmission), or to absorb the fourth light 1124 and/or the fifth light 1125.

For example, on the portion 1133 of the fourth optical surface 434 where the first to third lights 1121, 1122, and 1123 are not incident but only the fourth light 1124 and/or the fifth light 1125 are incident, the ghost prevention member (or the light shielding member) may be formed or provided so as to extract the fourth light 1124 and/or the fifth light 1125 to the outside of the light guide portion 440b that is not directed towards the user's eye 1110 (e.g., using scattering, reflection, and/or transmission), or to absorb the fourth light 1124 and/or the fifth light 1125.

For example, on the portion 1134 of the fourth optical surface 434 where the fourth light 1124 and/or the fifth light 1125 are not incident (or incident at a small amount that is not more than a pre-set threshold), but the first to third lights 1121, 1122, and 1123 are incident (e.g., only the first to third lights 1121, 1122, and 1123 are incident), a reflective film may be formed or provided so as to at least partially reflect the first to third lights 1121, 1122 and 1123 towards the user's eye 1110 so that the fourth light 1124 and/or the fifth light 1125 can be extracted to the outside of the light guide portion 440b, which is not directed towards the user's eye 1110, through the remaining portion of the fourth optical surface 434 where the reflective film is not formed or provided (e.g., using, for example, scattering or transmission).

Figure 18:
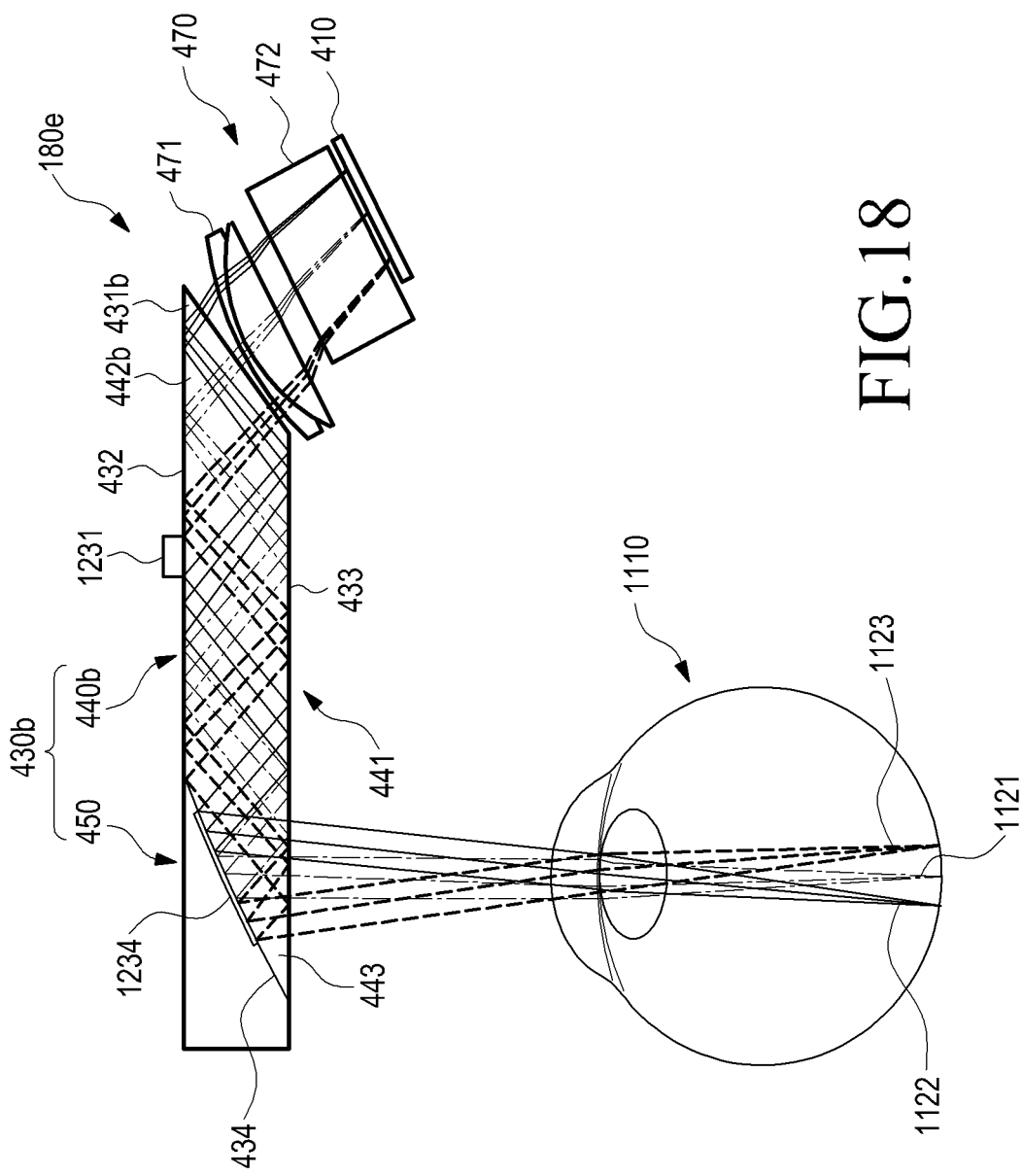
FIG. 18 illustrates a configuration of a first projector according to yet another exemplary embodiment.

FIG. 18 illustrates a configuration of a first projector 180e according to yet another exemplary embodiment. The first projector 180e illustrated in FIG. 18 has a configuration which is the same as or similar to that of the first projector 180d illustrated in FIG. 17, except that the first projector 180e further includes a ghost prevention member 1231 and a reflective film 1234. Accordingly, the same components will be denoted with the same reference numerals and redundant descriptions will be omitted below. According to another exemplary embodiment, the first projector 180e may further include a transparent cover glass provided on the surface of the display element 410. Furthermore, according to another exemplary embodiment, the first projector 180e may not include a compensation portion 450.

The ghost prevention member 1231 may be formed or provided on the portions of the second optical surface 432 and/or the third optical surface 433 where the first to third lights 1121, 1122, and 1123 are not incident from the inside of the light guide portion 440*b*, but the lights forming a ghost image are incident. The ghost prevention member 1231 may extract the lights forming the ghost image to the outside of the light guide portion 440*b* that is not directed towards the user's eye 1110 (e.g., using, for example, scattering, reflection or transmission) or absorb the lights. For example, the ghost prevention member 1231 may be formed on a portion of the second optical surface 432 where the first to third lights 1121, 1122, and 1123 are not incident, but the lights forming the ghost image are incident.

The reflective film 1234 may be formed on (e.g., only on) a portion of the fourth optical surface 434 where the lights forming a ghost image are not incident, but only the first to third lights 1121, 1122, and 1123 are incident. The reflective film 1234 may at least partially reflect the first to third lights 1121, 1122, and 1123 towards the user's eye 1110, and at least partially pass/transmit the lights input from the outside of the first projector 180*e*.

FIGS. 19A to 19D exemplify various ghost prevention members 1310, 1320, 1330, and 1340 according to various exemplary embodiments.

Figure 19A:
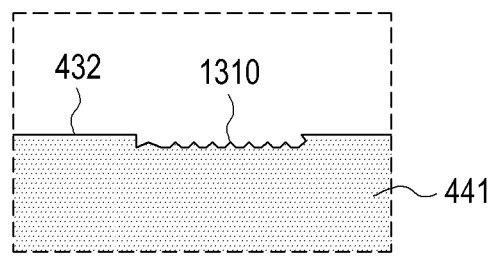
FIGS. 19A to 19D exemplify various ghost prevention members according to one or more exemplary embodiments.

Referring to FIG. 19A, a first ghost prevention member 1310 may be formed or provided on the second optical surface 432 of the body 441 to scatter (or diffuse) input light. For example, the first ghost prevention member 1310 may be formed through injection molding of the light guide element 430*b*/light guide portion 440*b* using a mold, or by rubbing the second optical surface 432 with a course sand paper or a similar abrasive material.

Figure 19B:
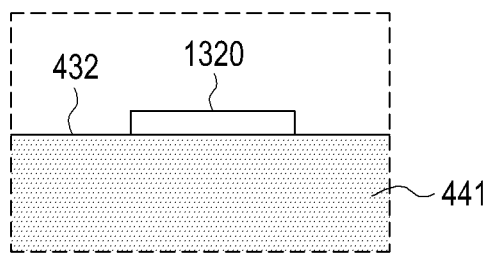

Referring to FIG. 19B, a second ghost prevention member 1320 may be formed or provided on the second optical surface 432 of the body 441 to absorb incident light. The second ghost prevention member 1320 may be formed by coating or printing a light shielding ink (e.g., black ink) on the second optical surface 432.

Figure 19C:
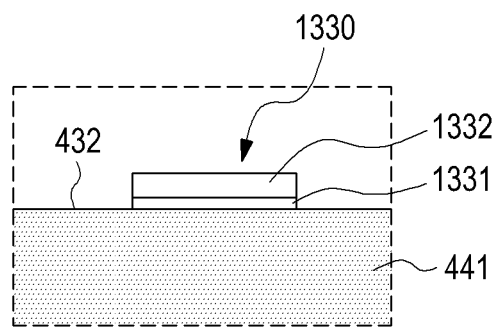

Referring to FIG. 19C, a third ghost prevention member 1330 may be formed or provided on the second optical surface 432 of the body to absorb incident light. The third ghost prevention member 1330 may be formed by attaching a light shielding film 1332 (e.g., a black film) using an adhesive member 1332 (e.g., an adhesive or an optical clear adhesive (OCA) tape).

Figure 19D:
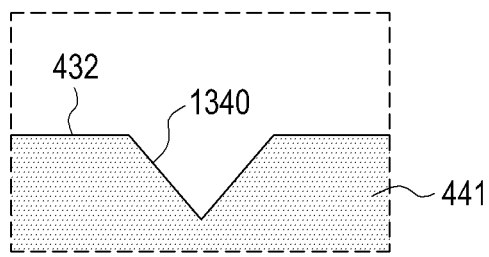

Referring to FIG. 19D, a fourth ghost prevention member 1340 in a form of a groove may be formed or provided on the second optical surface 432 of the body 441 to at least partially reflect incident light to pass through the third optical surface 433, or to at least partially pass/transmit the light incident on the second optical surface 432. The fourth ghost prevention member 1340 may be formed through the injection molding of the light guide element 430*b*/light guide portion 440*b* using a mold, or by cutting the second optical surface 432 using a V or U-shaped cutter.

Figure 20:
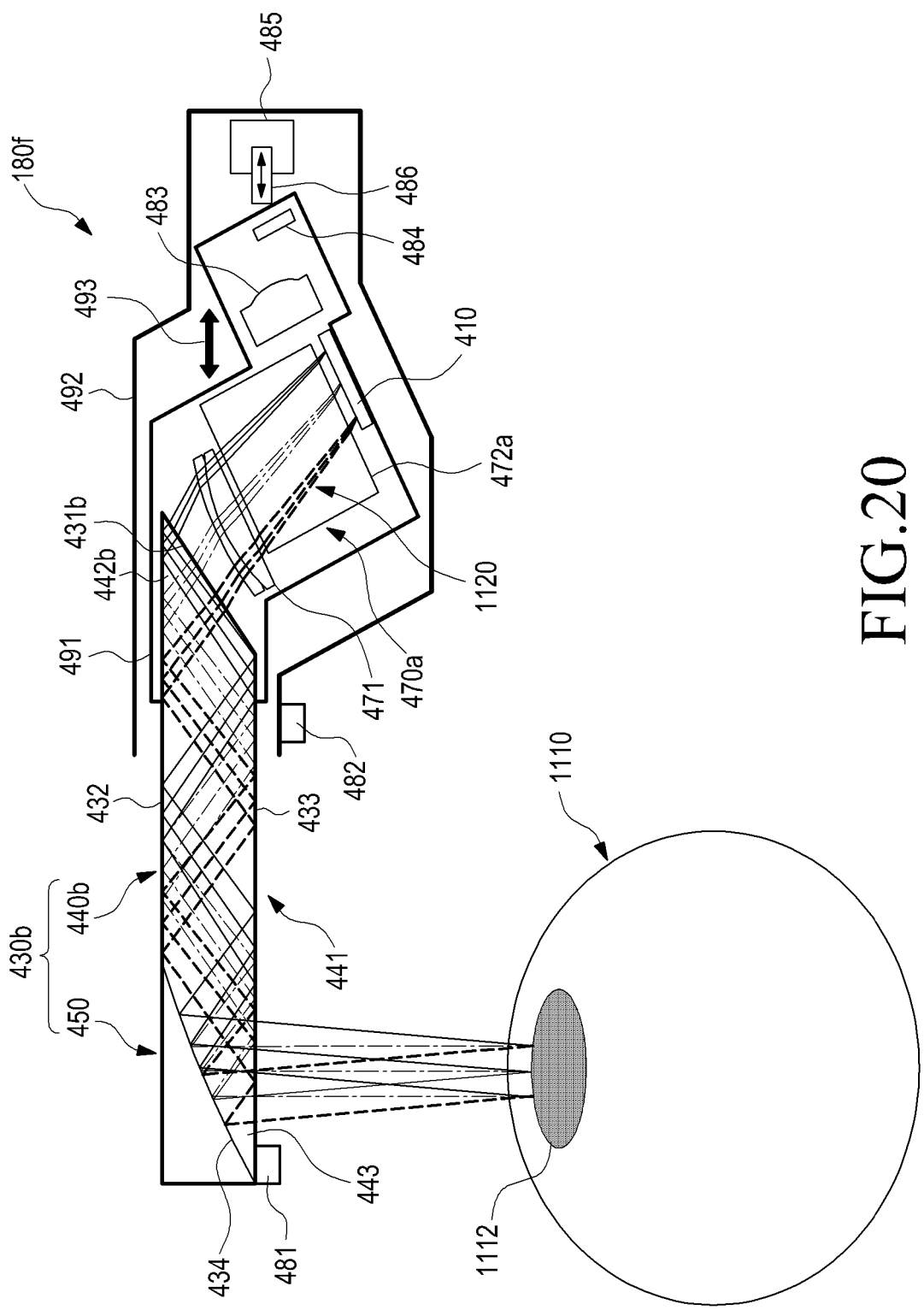
FIG. 20 illustrates a configuration of a first projector according to yet another exemplary embodiment.
Figure 21:
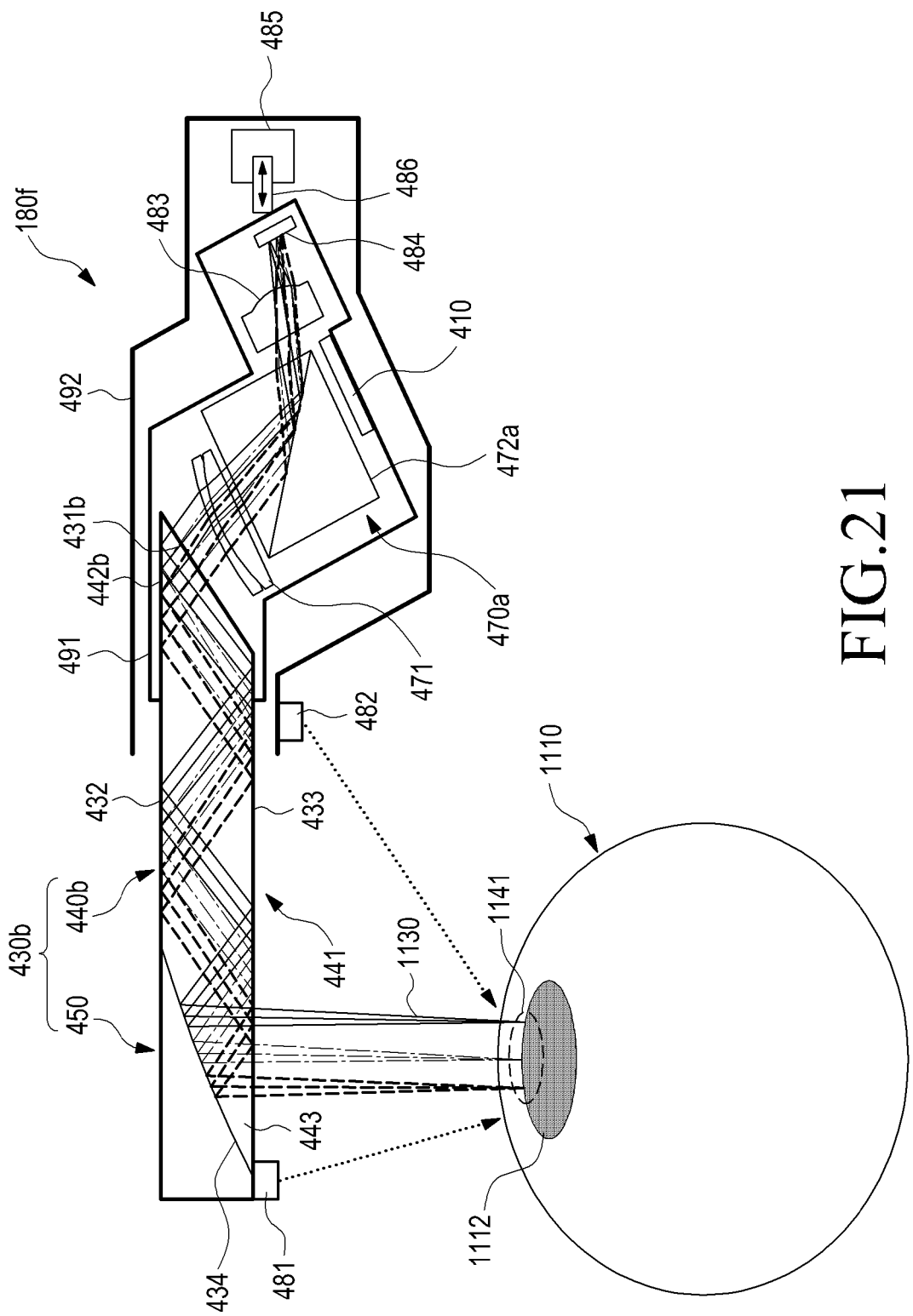
FIGS. 21 and 22 are views for describing an operation of the first projector of FIG. 20.
Figure 22:
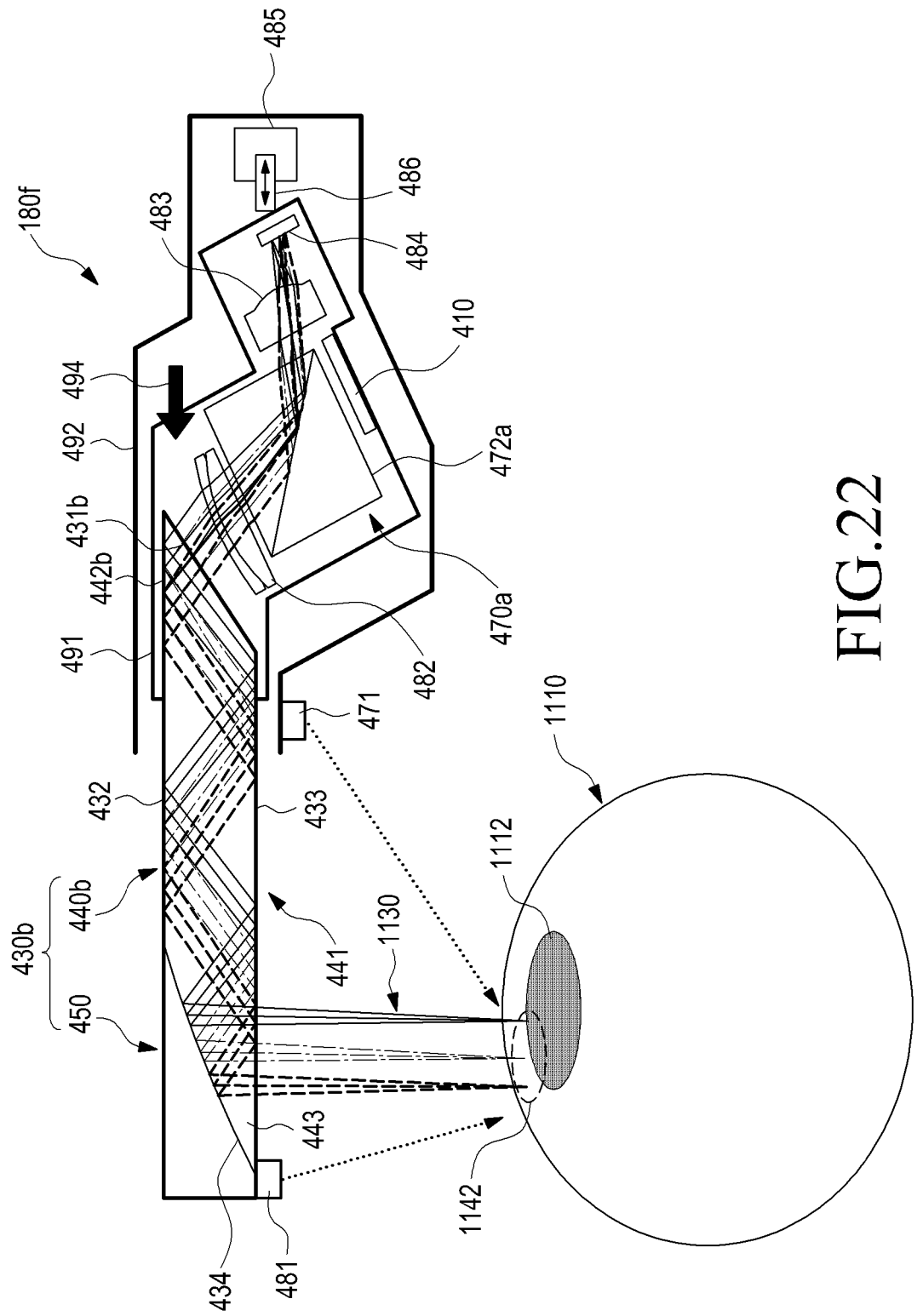

FIG. 20 illustrates a configuration of a first projector 180*f* according to yet another exemplary embodiment, and FIGS. 21 and 22 are views for describing an operation of the first projector 180*f* of FIG. 20. The first projector 180*f* illustrated in FIG. 20 is substantially the same as or similar to that of the first projector 180*d* illustrated in FIG. 17, except that the first projector 180*f* further includes a support 491, a housing 492, first and second light sources 481 and 482, a second lens 483, an image sensor 484, and an actuator 485. Accordingly, the same components will be denoted with the same reference numerals and redundant descriptions will be omitted below.

The light guide element 430*b* has a prismatic shape, and includes first to fourth optical surfaces 431*b*, 432, 433, and 434. The light guide element 430*b* includes a light guide portion 440*b* and a compensation portion 450 that are separated from each other by the fourth optical surface 434 which is a reflective surface. According to another exemplary embodiment, the first projector 180*f* may not include a compensation portion 450. The light guide portion 440*b* includes: a body 441 disposed between the second and third optical surfaces 432 and 433 and having a thickness (or a thickness in the widthwise direction of the light guide element 430*a*) that is constant along the visual axis 460 (or the optical axis) of the user's eye looking towards the front side; a first portion 442*b* disposed between the first and second optical surfaces 431*b* and 432 and having a thickness that gradually decreases towards the display element 410; and a second portion 443 disposed between the third and fourth optical surfaces 433 and 434 and having a thickness that gradually decreases in a direction away from the display element 410. According to another exemplary embodiment, the first projector 180*f* may further include a transparent cover glass provided on the surface of the display element 410. Furthermore, according to another exemplary embodiment, the first projector 180*f* may also include a ghost prevention member and/or a reflective film.

A lens system 470*a* is arranged between the display element 410 and the first optical surface 431*b*, and has a function of diffusing the first light 1120 output from the display element 410, and inputting the diffused light to the first optical surface 431*b*. The lens system 470*a* may include a plurality of lens surfaces, each of which refracts the light input thereto, in which the plurality of lens surfaces may be provided by at least one first lens 471. For example, the first lens 471 may include a cemented doublet lens in which a concave lens and a convex lens are cemented with each other. For example, the lens system 470*a* may further include a beam splitter (BS) 472*a* that passes therethrough the first light 1120 (e.g., visible light) input thereto and reflects a second light (e.g., IR light) input thereto. For example, the first light 1120 output from the display element 410 sequentially passes through the beam splitter 472*a* and the first lens 471 to be incident on the first optical surface 431*b*.

Each of the first and second light sources 481 and 482 may project the second light towards the user's eye 1110. The second light reflected from the user's eye 1110 may be input to the light guide element 430*b*.

The second lens 483 is capable of causing the second light output from the light guide element 430*b* to converge on a light-receiving face (or surface) of the image sensor 484.

The image sensor 484 may convert the second light input through the second lens 483 into an electric image signal (e.g., a digital image) and output the electric image signal to the control unit 200.

The support 491 may have a cylindrical shape, of which one end is opened and the lateral side and the other end are closed. The support 491 may at least partially accommodate therein and support the light guide element 430*b*, the lens system 470*a*, the display element 410, the second lens 483, and the image sensor 484. For example, a part of the light guide element 430*b* on the first portion 442*b* side is fixedly inserted into the support 491, and the lens system 470*a*, the display element 410, the second lens 483, and the image sensor 484 may be fixedly accommodated within the support 491.

The actuator 485 includes an arm 486 capable of performing backward and forward movements, and one end of the arm 486 may be fixed to the support 491. The actuator 485 may move the arm 486 forward or backward along the longitudinal direction of the light guide element 430b (the direction perpendicular to the visual axis (or the optical axis) of the user's eye looking towards the front side) to correspond to a distance or position according to a control signal from the control unit 200. According to the movement of the arm 486, the support 491, and the light guide element 430b, the lens system 470a, the display element 410, the second lens 483, and the image sensor 484, which are fixed to the support, may also move along the longitudinal direction of the light guide element 430b (see arrow 493).

The housing 492 may have a cylindrical shape, of which one end is opened and the lateral side and the other end are closed. The housing 492 may at least partially accommodate therein and support the support 491 and the actuator 485. For example, the support 491 and the actuator 485 may be fixedly accommodated in the housing 492.

Referring to FIG. 21, each of the first and second light sources 481 and 482 may project the second light 1130 (e.g., IR light) towards the user's eye 1110. The second light 1130 reflected from the user's eye 1110 may be input to the light guide element 430b.

The second light 1130 may be incident on the fourth optical surface 434 through the third optical surface 433, and the second light 1130 may be reflected by the fourth optical surface 434. The second and third optical surfaces 432 and 433 may totally reflect the second light 1130 reflected by the fourth optical surface 434 to travel to the first optical surface 431b.

After having passed through the first optical surface 431b, the second light 1130 may be input to the beam splitter 472a through the first lens 471, and the beam splitter 472a may reflect the second light 1130 towards the second lens 483.

The second lens 483 may cause the second light 1130 output from the beam splitter 472a to converge on the light receiving face (or surface) of the image sensor 484. The image sensor 484 may convert the second light 1130 input through the second lens 483 into an electric image signal (e.g., digital image) and output the electric image signal to the control unit 200.

For example, the control unit 200 may recognize an iris image portion corresponding to the iris 1112 of the user's eye 1110 from the image of the user's eye 1110 obtained through the image sensor 484, and compare information for features extracted from the recognized iris image portion (e.g., an edge, a corner, an image pattern, or an outline) with registered feature information for the user's iris which has been previously stored in the storage unit 120. When the extracted feature information and the previously stored feature information are coincident with each other, the control unit 200 may determine that the registered user is detected.

For example, in response to the detection of the registered user, the control unit 200 may transmit authentication/secret information of the registered user (e.g., iris information, user identification information, user secret information) to an external electronic device (e.g., a server, a peripheral electronic device connected through short range communication, etc.), or execute a pre-set operation or function (e.g., an unlock function, an application execution function, a user account change function, a multimedia control function, etc.).

For example, the control unit 200 may recognize an eye image portion from the image of the user's eye 1110 obtained through the image sensor 484. The eye recognition may be performed using a related art eye recognition method, in which, by way of example, the outline of the eye or a template, which is stored in the storage unit 120, may be used. For example, the control unit 200 may perform eye learning through a plurality of users' eyes and recognize the eye from the input images based on the eye learning. The eye learning information may be stored in the storage unit 120.

The control unit 200 may detect the user's gaze direction for the recognized eye. The control unit 200 may detect the user's gaze direction using a related art eye tracking or eye detection technique. The control unit 200 may detect the gaze direction (or an eyeline/an eyeline direction/a looking direction) from a pose, posture, or position of the iris or pupil. The control unit 200 may perform a pre-set operation or function (e.g., screen scroll, screen change, object selection, focus movement, or cursor movement) in response to the detection of the user's gaze direction.

Referring to FIG. 21, an angle of view of the first projector 180f (or a portion 1141 of a subject (corresponding to the eye 1110 in the present example) that may be detected at one viewpoint by the image sensor 484 at a stationary state) may be determined based on the distance between the fourth optical surface 434 and the eye 1110, the distance between the fourth optical surface 434 and the image sensor 484, and the size/area of the fourth optical surface 434.

Referring to FIG. 22, when the angle of view of the first projector 180f cannot cover the eye 1110 entirely, the control unit 200 may perform a control such that the eye 1110 is photographed while the first projector 180f is moved.

The control unit 200 may transmit a control signal for moving the arm 486 forward to the actuator 485. The actuator 485 may move the arm 486 forward towards the light guide element 430b to correspond to the distance or position according to the control signal of the control unit 200. According to the forward movement of the arm 486, the support 491, and the light guide element 430b, the lens system 470a, the display element 410, the second lens 483, and the image sensor 484, which are fixed to the support 491, also move in the direction away from the actuator 485 or the housing 492 (see arrow 494).

FIG. 22 illustrates a state in which the angle of view of the first projector 430b (or a portion 1142 of a subject (corresponding to the eye 1110 in the present example) that may be detected at one viewpoint by the image sensor 484 at a stationary state) is moved according to the movement of the light guide element 430b (and the fourth optical surface 434).

Figure 23:
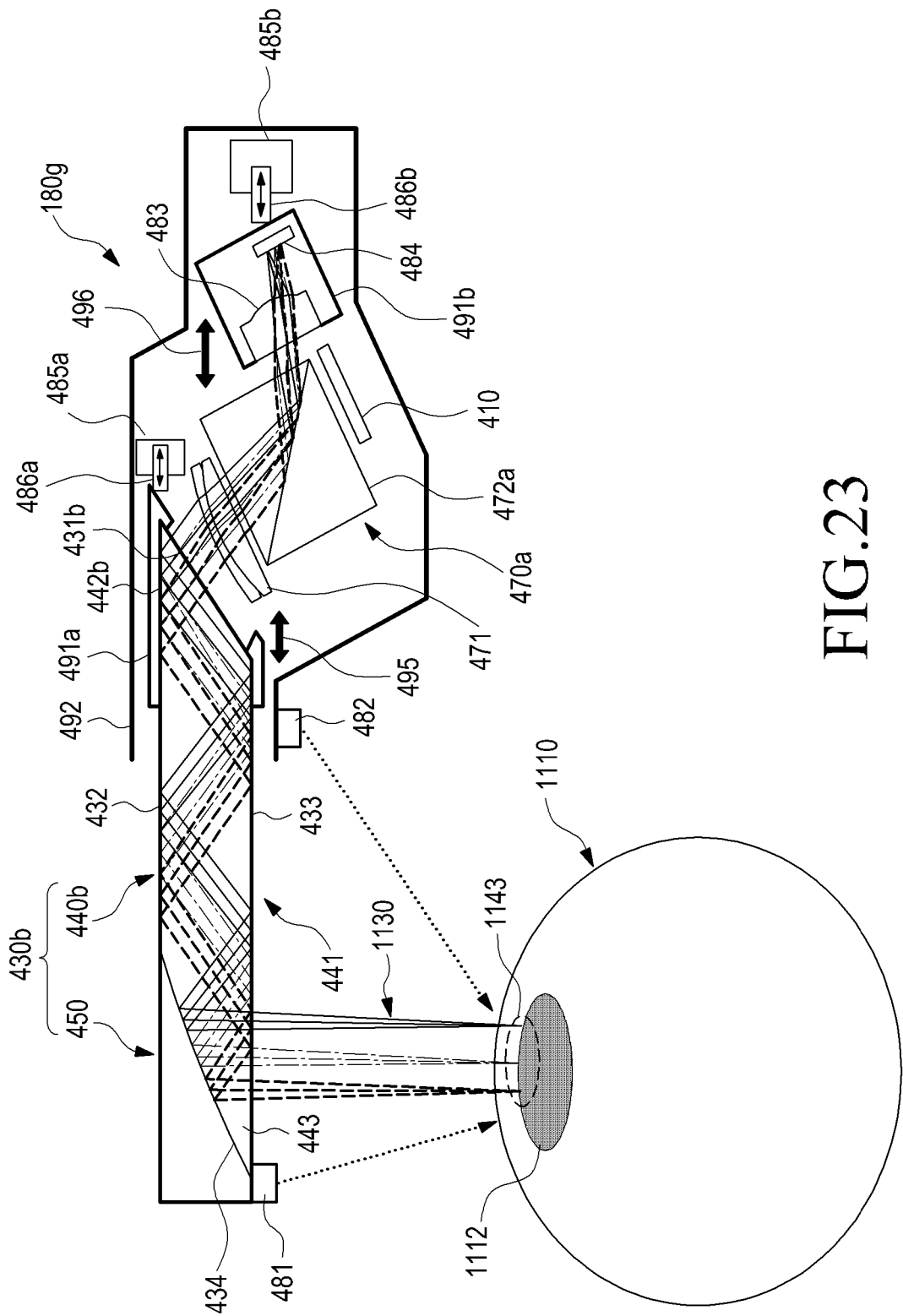
FIG. 23 illustrates a configuration of a first projector according to yet another exemplary embodiment.
Figure 24:
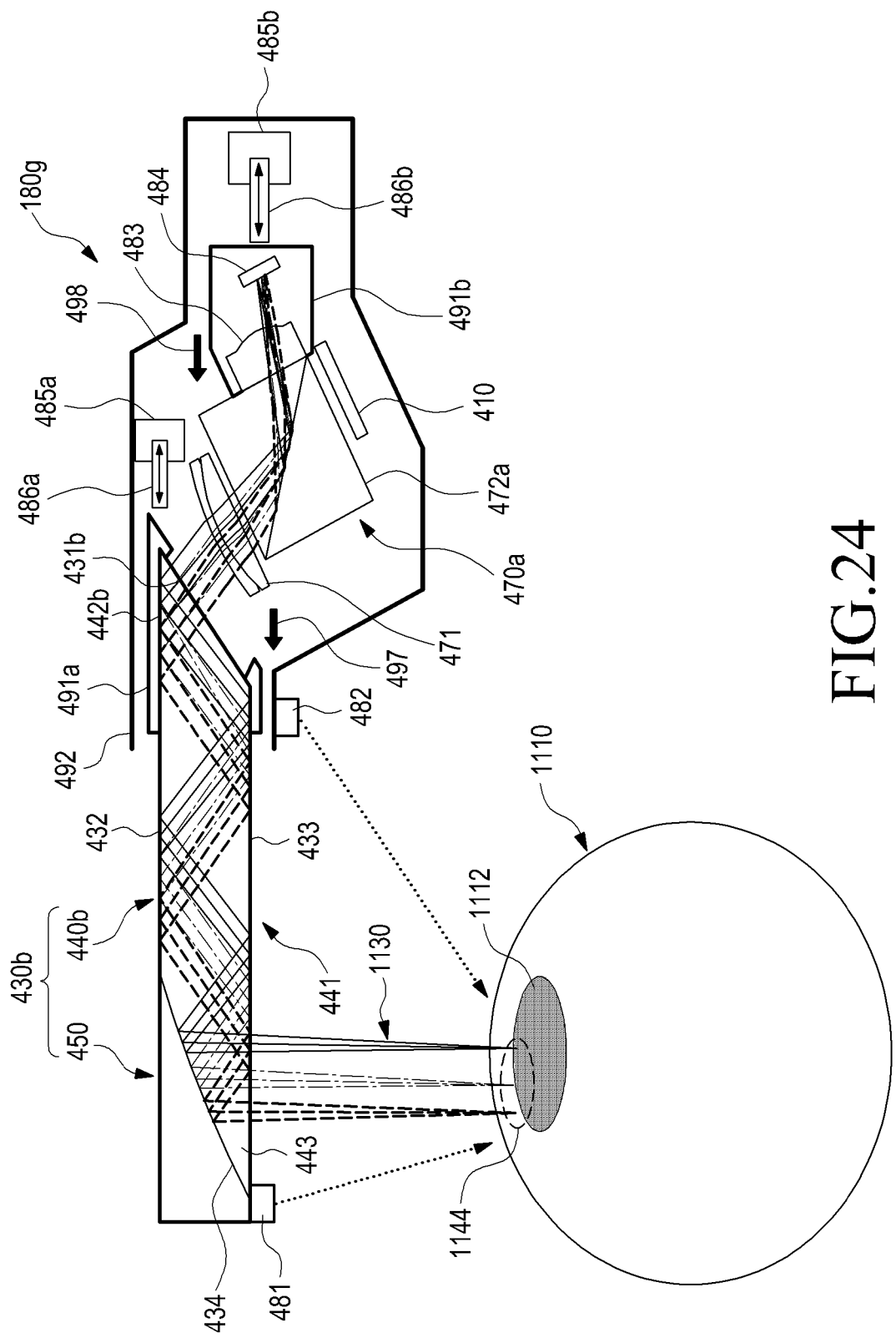
FIG. 24 is a view for describing an operation of the first projector of FIG. 23.

FIG. 23 illustrates a configuration of a first projector 180g according to yet another exemplary embodiment, and FIG. 24 is a view for describing an operation of the first projector 180g of FIG. 23. The first projector 180g illustrated FIG. 23 has a configuration which is substantially the same as or similar to that of the first projector 180f illustrated in FIG. 20, except that a first support 491a and a second support 491b are used instead of one support 491, and a first actuator 485a and a second actuator 485b are used instead of one actuator 485. Accordingly, the same components will be denoted with the same reference numerals and redundant descriptions will be omitted below. According to another exemplary embodiment, the first projector 180g may not include a compensation portion 450. Furthermore, according to another exemplary embodiment, the first projector 180g may also include a transparent cover glass provided on the surface of the display element 410. Moreover, according to another exemplary embodiment, the first projector 180g may also include a ghost prevention member and/or a reflective film.

The first support 491a may have a prismatic cylinder shape, of which the opposite ends are opened and the side surface is closed. The first support 491a may accommodate therein and support at least a part of the light guide element 430b. For example, a portion of the light guide element 430b on the first portion 442b side may be fixedly inserted into the first support 491a.

The second support 491b may have a prismatic cylinder shape, of which one end is opened and the side surface and the other end are closed. The second support 491b may at least partially accommodate therein and support at least the second lens 483 and the image sensor 484. For example, the second lens 483 and the image sensor 484 may be accommodated and fixed in the second support 491b.

The first actuator 485a includes a first arm 486a capable of performing forward and backward movements, in which one end of the first arm 486a may be fixed to the first support 491a. The first actuator 485a may move the first arm 486a along the longitudinal direction of the light guide element 430b (or the direction perpendicular to the visual axis (or the optical axis) of the user's eye 1110 looking towards the front side) to correspond to the distance or position according to a control signal from the control unit 200. According to the movement of the first arm 486a, the first support 491a and the light guide element 430b fixed to the first support 491a may also be moved along the longitudinal direction of the light guide element 430b (see arrow 495).

The second actuator 485b includes a second arm 486b capable of performing forward and backward movements, in which one end of the second arm 486b may be fixed to the second support 491b. The second actuator 485b may move the second arm 486b along the longitudinal direction of the light guide element 430b (or the direction perpendicular to the visual axis (or the optical axis) of the user's eye 1110 looking towards the front side) to correspond to the distance or position according to a control signal from the control unit 200. According to the movement of the second arm 486b, the second support 491b and the light guide element 430b fixed to the second support 491b may also be moved along the longitudinal direction of the light guide element 430b (see arrow 496).

Referring to FIG. 23, an angle of view of the first projector 180g (or a portion 1143 of a subject (corresponding to the eye 1110 in the present example) that may be detected at one viewpoint by the image sensor 484 at a stationary state) may be determined based on the distance between the fourth optical surface 434 and the eye 1110, the distance between the fourth optical surface 434 and the image sensor 484, and the size/area of the fourth optical surface 434.

Referring to FIG. 24, when the angle of view of the first projector 180g cannot cover the eye 1110 entirely, the control unit 200 may perform a control such that the eye 1110 is photographed while the first projector 180g is moved.

The control unit 200 may transmit a control signal for moving the first arm 486a forward to the first actuator 485a. The first actuator 485a may move the first arm 486a forward towards the light guide element 430b to correspond to the distance or position according to the control signal of the control unit 200. According to the forward movement of the first arm 486a, the first support 491a and the light guide element 430b fixed to the first support 491a also move in the direction away from the first actuator 485a or the housing 492 (see arrow 497).

The control unit 200 may transmit a control signal for moving the second arm 486b forward to the second actuator 485b. The second actuator 485b may move the second arm 486b forward towards the light guide element 430b to correspond to the distance or position according to the control signal of the control unit 200. According to the forward movement of the second arm 486b, the second support 491b, and the second lens 483, and the image sensor 484, which are fixed to the second support 491b, also move in the direction away from the second actuator 485b or the housing 492 (see arrow 498).

FIG. 24 illustrates a state in which the angle of view of the first projector 180g (or a portion 1144 of a subject (corresponding to the eye 1110 in the present example) that may be detected at one viewpoint by the image sensor 484 at a stationary state) is moved according to the movement of the light guide element 430b (and the fourth optical surface 434).

According to the operation of the first actuator 485a and the second actuator 485b according to a control of the control unit 200, the light guide element 430b, the second lens 483, and the image sensor 484 may move forward or backward together.

At least one exemplary embodiment provides a compact and light wearable display device in which an aberration by a manufacturing tolerance occurs less often.

It will be appreciated that at least one exemplary embodiment may be implemented in the form of software, hardware, or a combination thereof. For example, in the display device 100 illustrated in FIG. 1, components such as the storage unit 120, the communication unit 140, and the controller 200 may be implemented as devices, respectively, including, for example, circuitry, at least one processor, etc. Any such software may be stored, for example, in a volatile or non-volatile storage device such as a read only memory (ROM), a memory such as a random access memory (RAM), a memory chip, a memory device, or a memory integrated circuit (IC), or a recordable optical or magnetic medium such as a compact disc (CD), a digital versatile disc (DVD), a Blu-ray disc (BD), a magnetic disk, or a magnetic tape, regardless of its ability to be erased or its ability to be re-recorded. It can be also appreciated that the memory included in the portable terminal is one example of machine-readable devices suitable for storing a program including instructions that are executed by a processor device to thereby implement exemplary embodiments. Accordingly, one or more exemplary embodiments include a program that includes a code for implementing an apparatus or a method defined in any claim in the present specification and a machine-readable storage medium that stores such a program. Further, the program may be electronically transferred by a predetermined medium such as a communication signal transferred through a wired or wireless connection, and the present disclosure appropriately includes equivalents of the program.

Although exemplary embodiments are described in the above description, various modifications can be made without departing from the scope of the present inventive concept. Accordingly, the scope of the present invention shall not be determined by the above-described exemplary embodiments, and is to be determined by the following claims and their equivalents.

What is claimed is:

1. A wearable display device comprising:
 a display element configured to project a first light forming a virtual image;
 a first camera configured to capture an image of a front subject with reference to a position of a light guide element;
 a second camera configured to capture an image of a lower subject with reference to the position of the light guide element;

a controller configured to recognize a hand or a finger from the image captured through the second camera while the image captured through the first camera does not include the recognized hand or the recognized finger, and to change the virtual image displayed on the wearable display device to another virtual image according to a gesture of the recognized hand or the recognized finger;

at least one light source, distinct from the display element, configured to project a second light to an object;

the light guide element configured to guide the first light from the display element to the object and guide the second light reflected from the object to a beam splitter;

the beam splitter configured to pass therethrough the first light towards the light guide element and reflect the second light guided from the light guide element towards an image sensor;

the image sensor configured to generate an electrical image signal based on the second light reflected from the beam splitter; and at least one actuator configured to move the light guide element and the image sensor forward or backward together along a longitudinal direction of the light guide element.

2. The wearable display device of claim 1, wherein the light guide element comprises:
a first optical surface through which the first light from the display element is input;
a second optical surface configured to reflect the first light input through the first optical surface;
a third optical surface configured to reflect the first light input through the first optical surface; and
a fourth optical surface configured to reflect the reflected first light, reflected by the second optical surface and the third optical surface, to the predetermined position.

3. The wearable display device of claim 2, wherein the second optical surface and the third optical surface are parallel to each other.

4. The wearable display device of claim 2, wherein the fourth optical surface transmits some of the first light, and reflects a remainder of the first light to the predetermined position.

5. The wearable display device of claim 2, wherein:
the second optical surface and the first optical surface intersect at an acute angle within the light guide element;
the second optical surface and the fourth optical surface intersect at an obtuse angle within the light guide element; and
a chief ray of the first light is totally reflected 2n times, where n is a natural number greater than 1, by the second optical surface and the third optical surface.

6. The wearable display device of claim 2, further comprising a lens system between the first optical surface and the display element and configured to refract the first light projected from the display element.

7. The wearable display device of claim 2, wherein an angle between the second optical surface and the first optical surface is not equal to an angle between the second optical surface and a surface of the display element.

8. The wearable display device of claim 2, wherein:
the light guide element further comprises:
a light guide portion comprising the first optical surface, the second optical surface, the third optical surface, and the fourth optical surface, and
a compensation portion bonded to the fourth optical surface of the light guide portion, wherein the light guide portion and the compensation portion have powers that have opposite signs and a same absolute value.

9. The wearable display device of claim 2, wherein the light guide element further comprises:
a body between the second optical surface and the third optical surface and having a constant thickness;
a first portion between the first optical surface and the second optical surface and having a thickness that gradually increases towards the display element and away from the fourth optical surface along an axis parallel to the second optical surface; and
a second portion between the third optical surface and the fourth optical surface and having a thickness that gradually decreases in a direction away from the display element.

10. The wearable display device of claim 2, wherein the apex of the fourth optical surface is a single point of highest sag of the fourth optical surface away from a plane which is substantially parallel with the fourth optical surface.

11. The wearable display device of claim 2, further comprising a first window and a second window on a front side of the wearable display device,
wherein the controller is configured to control transmissivities of the first window and the second window.

12. The wearable display device of claim 11, wherein the controller is configured to control the transmissivities of the first window and the second window by controlling a voltage applied to the first window and the second window.

13. The wearable display device of claim 11, wherein the controller is configured to control the transmissivities of the first window and the second window according to a luminous intensity of a surrounding environment.

14. The wearable display device of claim 13, further comprising a sensor configured to measure the luminous intensity of the surrounding environment.

15. The wearable display device of claim 1, further comprising a touch sensor configured to sense at least one of a touch and a hovering gesture.

16. The wearable display device of claim 15, wherein:
the touch sensor is configured to recognize a fingerprint; and
the wearable display device further comprises a controller configured to, when first fingerprint data is input through the touch sensor, compare the first fingerprint data and second fingerprint data that is previously stored and to, when the first fingerprint data and the second fingerprint data correspond to each other according to the comparing, perform a function mapped to the second fingerprint data.

17. The wearable display device of claim 16, wherein the mapped function is one of an unlock function, an application execution function, a user account change function, and a multimedia control function.

18. The wearable display device of claim 1, further comprising a communicator configured to receive touch information from an external electronic device,
wherein the controller is further configured to change, according to the received touch information, the virtual image displayed on the wearable display device to another virtual image.

19. The wearable display device of claim 2, wherein a distance between an apex of the fourth optical surface and the third optical surface is less than a fifth of a distance between the second optical surface and the third optical surface.

20. The wearable display device of claim 2, further comprising a light shielding member on the second optical surface or the third optical surface to absorb some of the first light or to extract some of the first light to an outside of the light guide element.

21. The wearable display device of claim 1, further comprising another actuator configured to move the light guide element.

22. The wearable display device of claim 1, wherein the at least one actuator is configured to move the light guide element and the image sensor together.

23. The wearable display device of claim 1, further comprising a transparent cover glass on a surface of the display element facing the light guide element, to protect the surface of the display element.

* * * * *